US005742924A

United States Patent [19]
Nakayama

[11] Patent Number: 5,742,924
[45] Date of Patent: Apr. 21, 1998

[54] APPARATUS AND METHOD FOR NAVIGATING MOBILE BODY USING ROAD MAP DISPLAYED IN FORM OF BIRD'S EYE VIEW

[75] Inventor: Okihiko Nakayama, Yokohama, Japan

[73] Assignee: Nissan Motor Co., Ltd., Kanagawa, Japan

[21] Appl. No.: 566,290

[22] Filed: Dec. 1, 1995

[30] Foreign Application Priority Data

| Dec. 2, 1994 | [JP] | Japan | 6-299662 |
| Dec. 12, 1994 | [JP] | Japan | 6-307612 |
| Feb. 24, 1995 | [JP] | Japan | 7-037054 |

[51] Int. Cl.$^6$ .................. G01C 21/20; G09B 29/00; G06F 165/00
[52] U.S. Cl. .................. 701/208; 340/995
[58] Field of Search .................. 364/444.1, 449.3, 364/449.6, 449.2, 449.7, 460; 340/995; 345/139; 395/119, 122

[56] References Cited

U.S. PATENT DOCUMENTS

| 4,660,037 | 4/1987 | Nakamura | 340/990 |
| 4,737,916 | 4/1988 | Ogawa et al. | 364/443 |
| 4,899,285 | 2/1990 | Nakayama et al. | 364/453 |
| 4,963,865 | 10/1990 | Ichikawa et al. | 340/995 |
| 5,031,104 | 7/1991 | Ikeda et al. | 364/449 |
| 5,121,326 | 6/1992 | Moroto et al. | 364/449 |
| 5,161,886 | 11/1992 | De Jong et al. | 364/449 |
| 5,315,298 | 5/1994 | Morita | 340/995 |
| 5,371,678 | 12/1994 | Nomura | 364/444 |
| 5,398,188 | 3/1995 | Maruyama | 364/449 |
| 5,544,052 | 8/1996 | Fujita et al. | 364/420 |
| 5,574,648 | 11/1996 | Pilley | 364/449 |

FOREIGN PATENT DOCUMENTS 0 660 290A1  6/1995  European Pat. Off.

*Primary Examiner*—Michael Zanelli
*Attorney, Agent, or Firm*—Lowe, Price, LeBlanc & Becker

[57] ABSTRACT

In apparatus and method for navigating a mobile body such as an automotive vehicle along a set route of travel, a road map stored in an external large-capacity memory unit such as a CD-ROM on a two-dimensional plane is graphically drawn on a display frame of an image screen with a degree of particulars of the road map data varied according to a displayed position of the image screen with respect to the display frame so that the graphically drawn road map in a form of a bird's eye view is viewed three-dimensionally with a feeling of depth given to a viewer. In an embodiment, as the displayed position of the image screen becomes upper with respect to the display frame, the degree of the particulars becomes lower.

31 Claims, 26 Drawing Sheets

APPARATUS AND METHOD FOR NAVIGATING MOBILE BODY USING ROAD MAP DISPLAYED IN FORM OF BIRD'S EYE VIEW

BACKGROUND OF THE INVENTION

The present invention relates generally to a navigating apparatus and method applicable to a route guidance system for an automotive vehicle (mobile body) and particularly relates to the apparatus and method for navigating the vehicle placed at a present position to a destination to which the vehicle is finally to reach via an optimum route of travel, a road map displayed on an image screen of a display being in a form of bird's eye view which can be viewed from a viewer approximately more three-dimensionally.

A European Patent Application Publication No. 0 878 271 published on Jan. 11, 1989 (which corresponds to a Japanese Patent Application First Publication No. Heisei 2-244188) and a U.S. patent application Ser. No. 08/362,647 which corresponds to a European Patent Application No. 94120448.9 (filed on Dec. 22, 1994 and is published on Jan. 28, 1995 as No. 0 660 290) and which corresponds to a Korean Patent Application No. 94-87227 (filed on Dec. 27, 1994), each of which exemplifies previously proposed vehicular navigating apparatus and method in which a road map is displayed in the form of the bird's eye view and which are applicable to the vehicular travel route guidance system from the present position of the vehicle to the destination.

However, there are still the following problems to be solved and there are still the following industrial demands to be satisfied.

1) When the road map data in the two-dimensional plane are directly coordinate transformed into the road map in the form of the bird's eye view, a displayed part of the road map placed in the vicinity to the vehicular present position is expanded and displayed on the image screen so that a degree of density of road map data on that displayed part becomes lower. On the contrary, as another displayed part of the rod map placed away from the present position of the vehicle becomes farther away from the displayed road map part placed in the vicinity to the present position, the other part described above is compressed (scale reduced) and displayed on the image screen so that the degree of density of the road map data on that part becomes higher, thus the bird's eye view displayed on the image screen is difficult for a viewer to view and analyze the displayed road map.

In addition, as the part of the displayed image becomes farther away from the present position, the information on the details of the narrower city streets located away from the present position can unavoidably be displayed although they are unnecessary from the standpoint of the viewer to be displayed.

Consequently, it becomes difficult to discriminate the principal information such as a national highway due to (disturbance or hidden by) the displayed detailed data such as the city street information. Furthermore, it takes an extra graphical drawing time to display all of the road map data in the form of the bird's eye views to be displayed on the image screen so that any one of the road maps in the form of the bird's eye view cannot be displayed timely without delay whenever the vehicle is moved (or turned)

2) The road map display in the form of the bird's eye view needs to always be updated due to the movement of a view point at which the presently displayed road map is viewed along with the movement of the vehicle. Therefore, although such an idea that the road map data in the form of the bird's eye view are previously prepared and stored in a memory unit may be considered, a tremendous amount of capacity of storing the road maps already in the forms of the bird's eye views that the memory unit has are required. Hence, this method is not practical. Thus, each of the road maps in the form of the bird's eye view needs to be prepared with a coordinate system of conventional two-dimensional road map data transformed whenever the vehicle moves.

Normally, the road map data are stored in an external memory unit having a large capacity of memory such as a CD-ROM (Compact Disc Read Only Memory). When any one of the road maps is displayed on the image screen of a display, a microcomputer reads in at least any one of the road map data to be graphically drawn and the read road map data is displayed through the display via a graphic controller (so called, G-CTR).

If the conventional two-dimensional road map display and the road map display in the form of the bird's eye view are compared with each other, the road map display in the form of the bird's eye view needs wider range of the road map data than the conventional two-dimensional type road map display. That is to say, the navigation apparatus for the road map display in the bird's eye view needs to read the road map data having the wider range of road map data from the external memory unit since the road map in the form of the bird's eye view displays surrounding areas including the present position at which the vehicle is present and including the destination to which the vehicle is finally to reach. On the contrary, since, in the conventional road map in the form of the two-dimensional plane, only road map data having a relatively narrow range may be read from the external memory unit since the road map surrounding the present position of the vehicle may only be displayed.

Hence, to display the road map in the form of the bird's eye view, a large amount of data needs to be read from the external memory unit so that access time of the microcomputer to the external memory unit becomes long and the road map in the form of the bird's eye view cannot be updated without delay whenever the vehicle moves. In addition, since an internal memory unit having a large capacity is needed to store the large amount of data read From the external memory unit, a cost of structuring the vehicular navigation apparatus displaying the road map in the form of the bird's eye view is accordingly increased.

3) The displayed road map in the form of the bird's eye view gives the viewer no feeling of distance (depth) and, rather, gives the same feeling as viewing a plan view even though a percentage of scale reduction becomes larger as the viewer views from a lower position of the displayed image screen up to an upper position thereof.

SUMMARY OF THE INVENTION

It is an object of the present invention to provide improved apparatus and method for navigating a mobile body which provides a road map in the form of bird's eye view on an image screen of a display unit which have solved the above-described problems and satisfied the industrial demands, i.e., which can quickly update the road map ranging from the surroundings of a present position of the mobile body and a destination to which the mobile body is finally to reach in the form of the bird's eye view displayed on the image screen along with the movement of the mobile body, the road map displayed in the form of the bird's eye view giving a feeling of viewing an approximately three-dimensional plane road map with a feeling of depth given to a viewer.

According to one aspect of the present invention, there is provided with an apparatus for navigating a mobile body, comprising:

a) storing means for storing a plurality of road map data, each road map data stored therein being formed on a two-dimensional plane and having a degree of particulars;

b) graphical drawing means for graphically drawing at least any one of the road map data stored in said storing means which is related to a present position of the mobile body and a destination to which the mobile body is finally to reach on an display image screen in a form of a bird's eye view so that the degree of the particulars is varied according to a displayed position of the corresponding one of the road map data on the display image screen; and c) a display unit having the display image screen and which is so arranged and constructed as to operatively display the graphically drawn road map data in the form of the bird's eye view so that the graphically drawn road map data is viewed approximately three-dimensionally with a feeling of depth given to a viewer of the display image screen.

According to another aspect of the present invention, there is provided with a navigating apparatus comprising:

a) present position detecting means for detecting a present position of a mobile body and a forwarding direction toward which the mobile body moves at the present position thereof;

b) initial display parameter value setting means for previously setting the detected present position and display parameters thereinto as initial values;

c) direction of line of sight determining means for determining a direction of line of sight for a perspectively projected image on the basis of at least the detected forward direction;

d) view point position determining means for determining a position of a view point on which the direction of line of sight is based as a function of at least the information of the forwarding direction detected by the present position detecting means;

e) road map data storing means for storing at least a road map data expressed with a two-dimensional X-Y plane as a reference;

f) coordinate transforming means for executing a coordinate transformation of the road map data stored in said road map storing means on the basis of at least the determined direction of line of sight and the determined view point into a bird's eye view so as to generate the bird's eye view therefrom;

g) display means for receiving the display data of the bird's eye view and for displaying the bird's eye view on its image screen; and h) graphical drawing means for graphically drawing any one of road map data stored in said road map data storing means and having a relatively high degree of the particulars in the form of the bird's eye view on a relatively low positioned region of the image screen through said display means and for graphically drawing another regional road map stored in the road map data storing means and which is adjacent to the regional road map having the relatively high degree of the particulars, said other road map data having a relatively low degree of the particulars being graphically drawn in the form of the bird's eye view on a relatively high positioned region of the image screen through said display unit, so that a whole displayed road map is in the form of the bird's eye view as an approximately three-dimensional image with a feeling of a depth given to a viewer.

According to still another aspect of the present invention, there is provided with a method for navigating a mobile body along a set route of travel, comprising the steps of:

a) storing a plurality of road map data, each road map data stored therein being formed on a two-dimensional plane and having a degree of particulars;

b) graphically drawing at least any one of the road map data stored in said storing means which is related to a present position of the mobile body and a destination to which the mobile body is finally to reach on an display image screen in a form of a bird's eye view so that the degree of the particulars is varied according to a displayed position of the corresponding one of the road map data on the display image screen; and c) displaying the graphically drawn road map data in the form of the bird's eye view on an image screen so that the graphically drawn road map data is viewed approximately three-dimensionally with a feeling of depth given to a viewer of the image screen.

Figure 15:
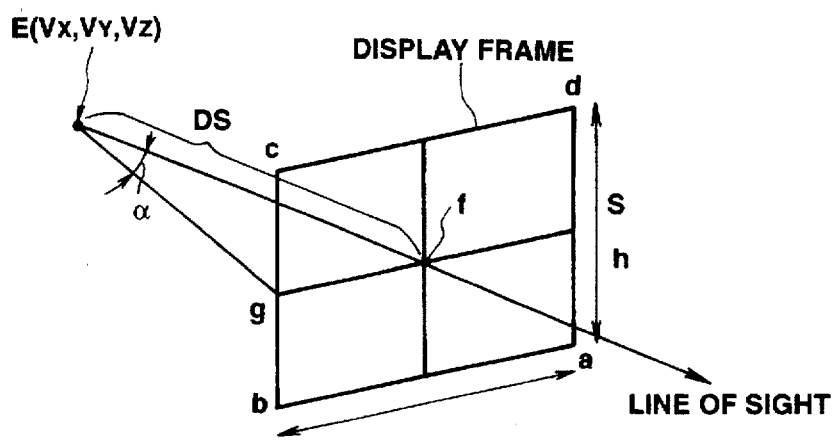

FIG. 15 is an explanatory view of a relationship between the view point E and the display frame abcd of the display 10.

Figure 13:
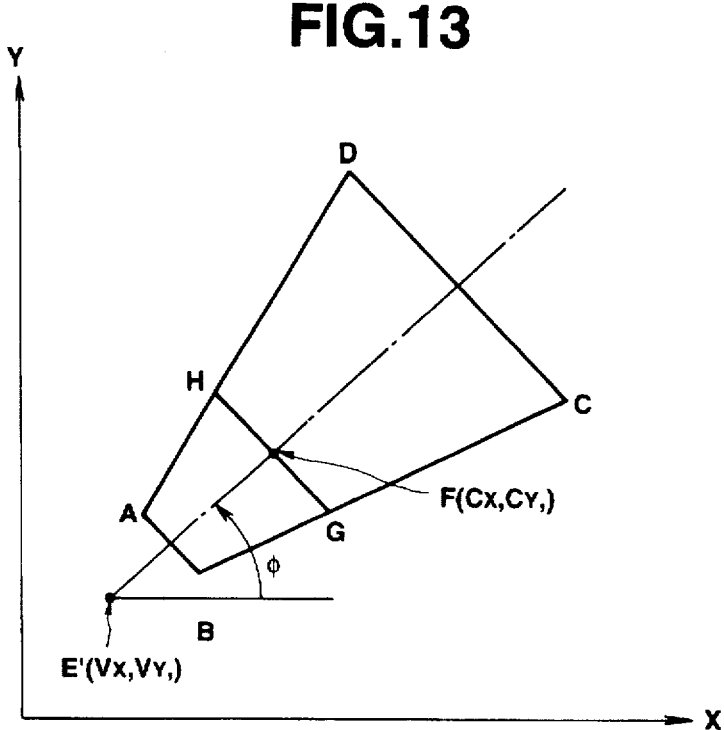
FIGS. 13 is an explanatory view of an XY plane shown in FIG. 2 with a Z axis in a three-dimensional coordinate system as an origin in a case of the second embodiment.
Figure 16:
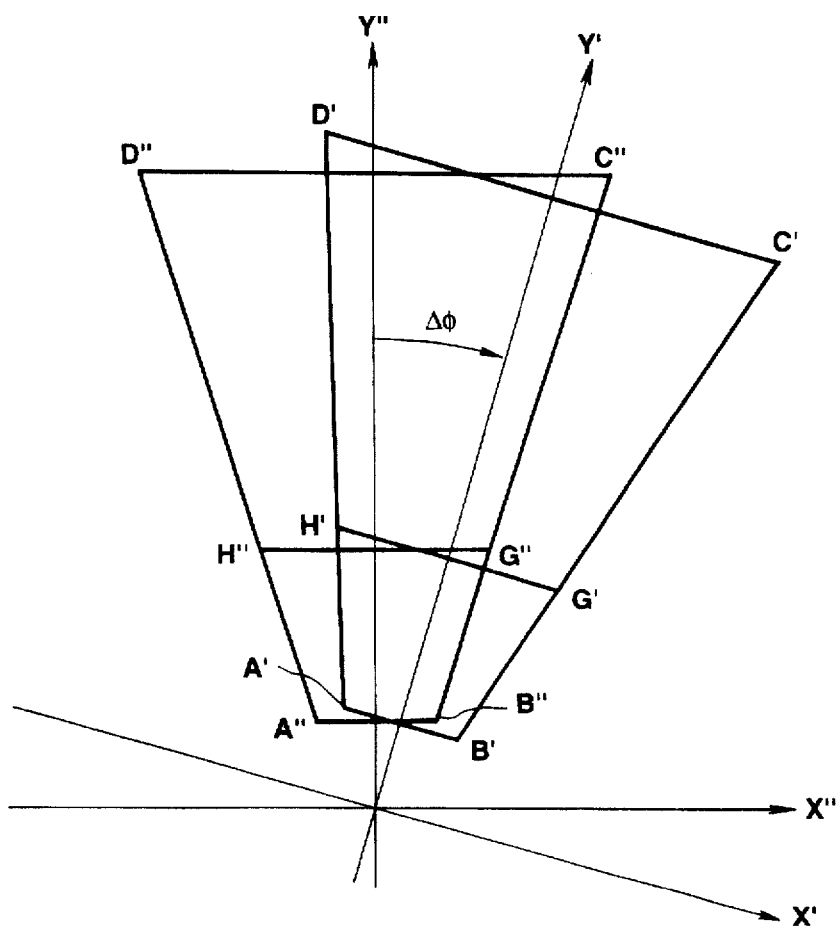

FIG. 16 is an explanatory view for explaining an X'Y' coordinate system with the XY coordinate system shown in FIG. 13 parallel translated so that the view point provides the origin and an X"Y" coordinate system with the X'Y' coordinate system rotated so that the direction of the line of sight φ is overlapped on the Y axis.

Figure 17A:
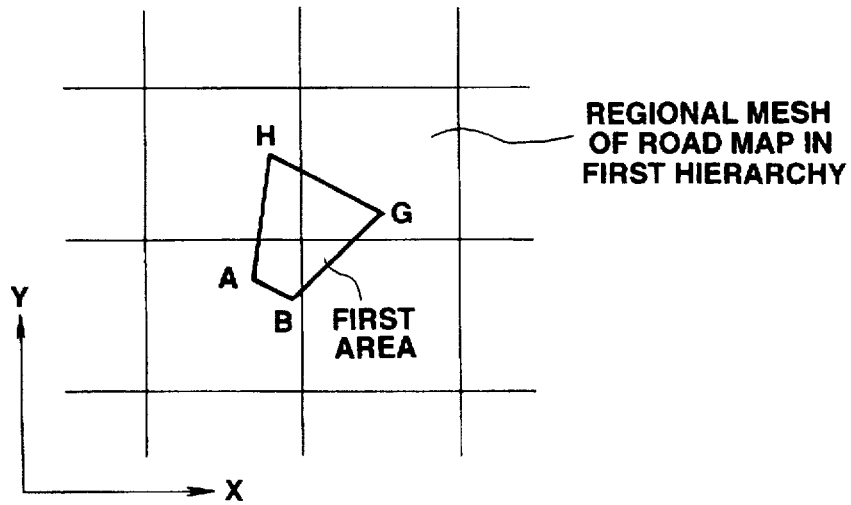
Figure 17B:
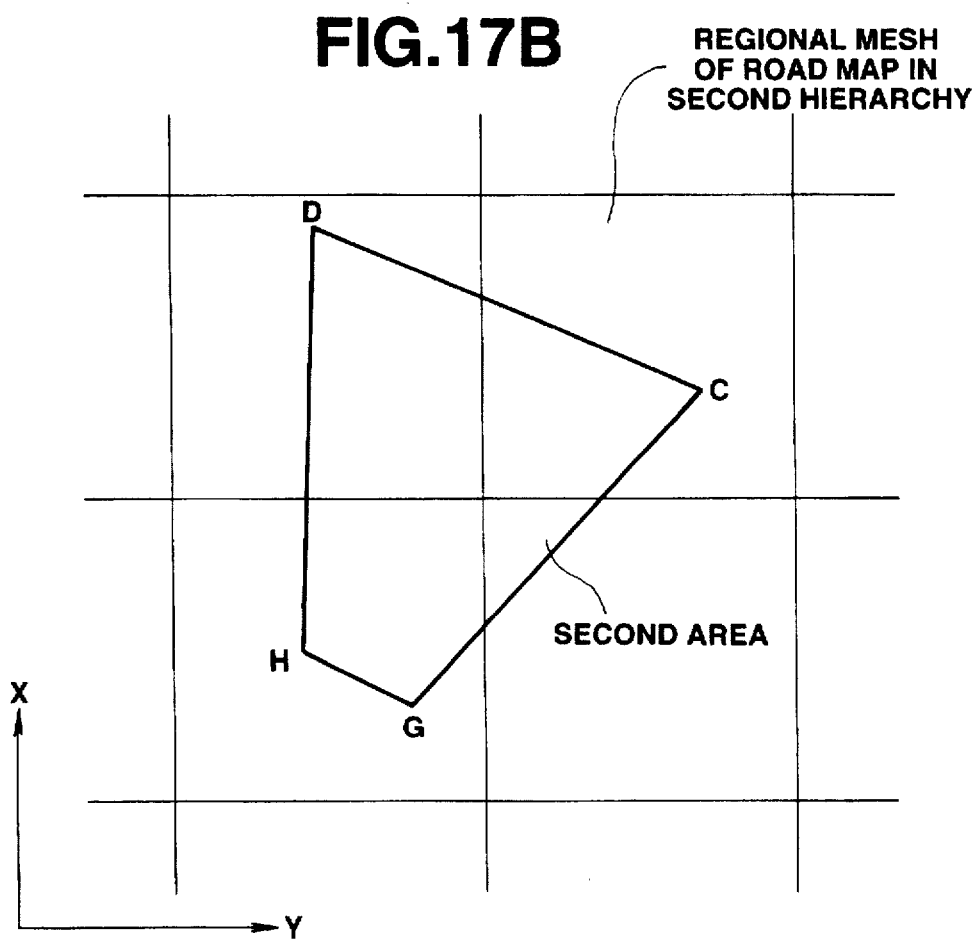

FIG. 17A and 17B are explanatory views of the XY coordinate system indicating read ranges (first area and second area) of the road map data corresponding to the display regions.

Figure 18:
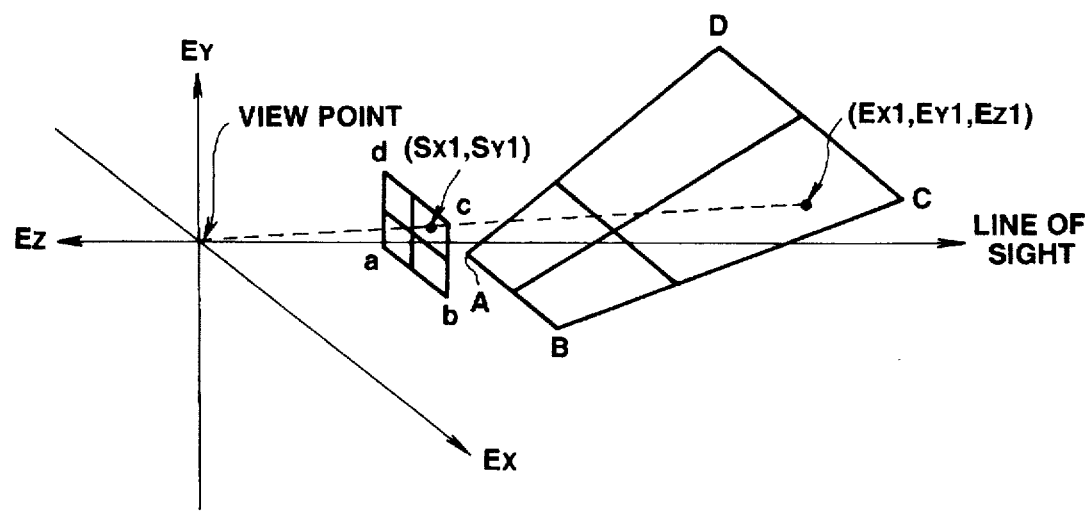

FIG. 18 is an explanatory view for explaining a relationship between the display frame abcd and the display region ABCD in an EXEYEZ coordinate system.

Figure 19:
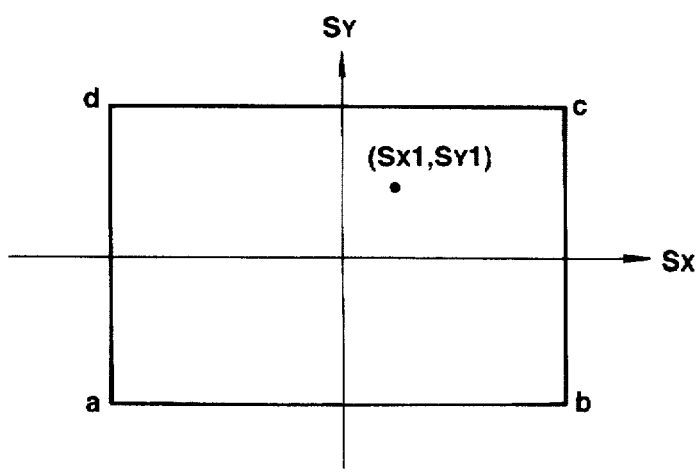

FIG. 19 is an explanatory view for explaining a position of an arbitrary road map data in an SXSY display image screen coordinate system.

Figure 20A:
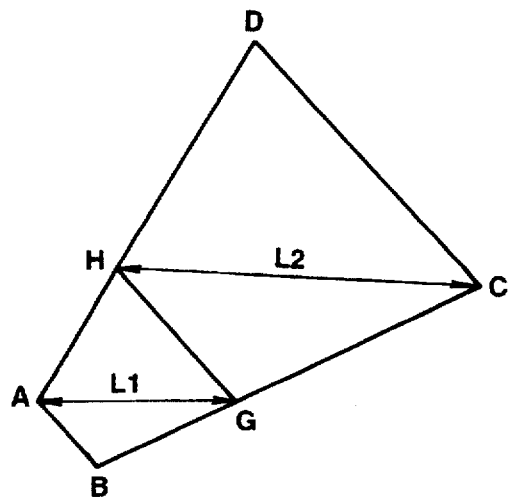
Figure 20B:
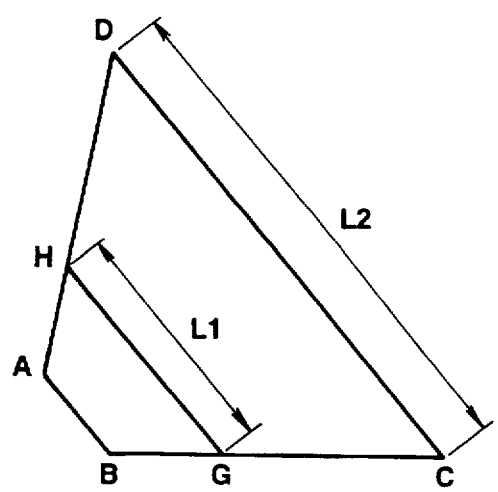

FIGS. 20A and 20B are explanatory views for explaining a relationship between a shape and a dimension of a display region and the number of regional meshes in the case of the second embodiment.

Figure 21:
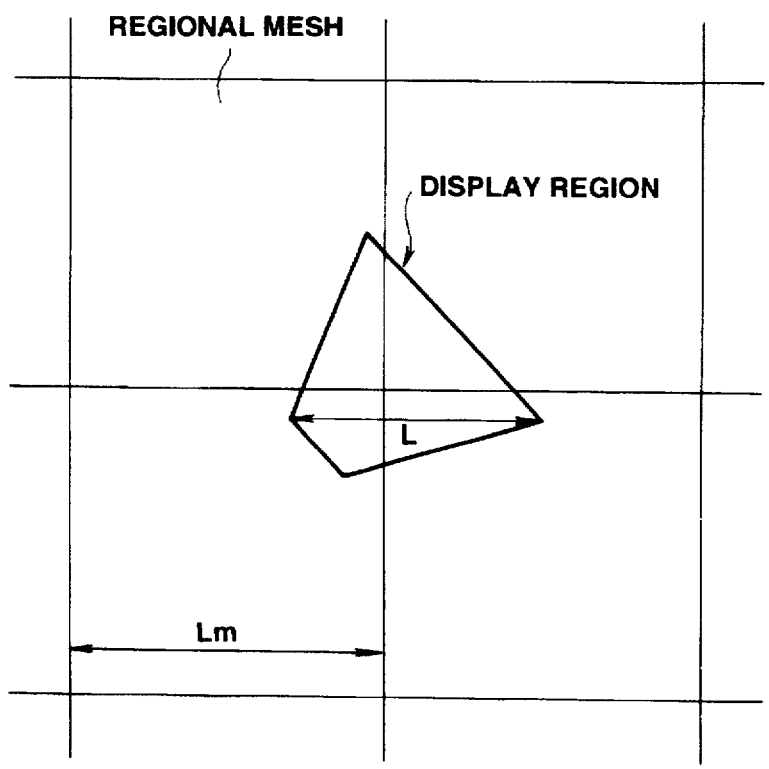

FIG. 21 is an explanatory view of the shape and the dimension of the display region and the number of regional meshes in the case of the second embodiment.

Figure 22:
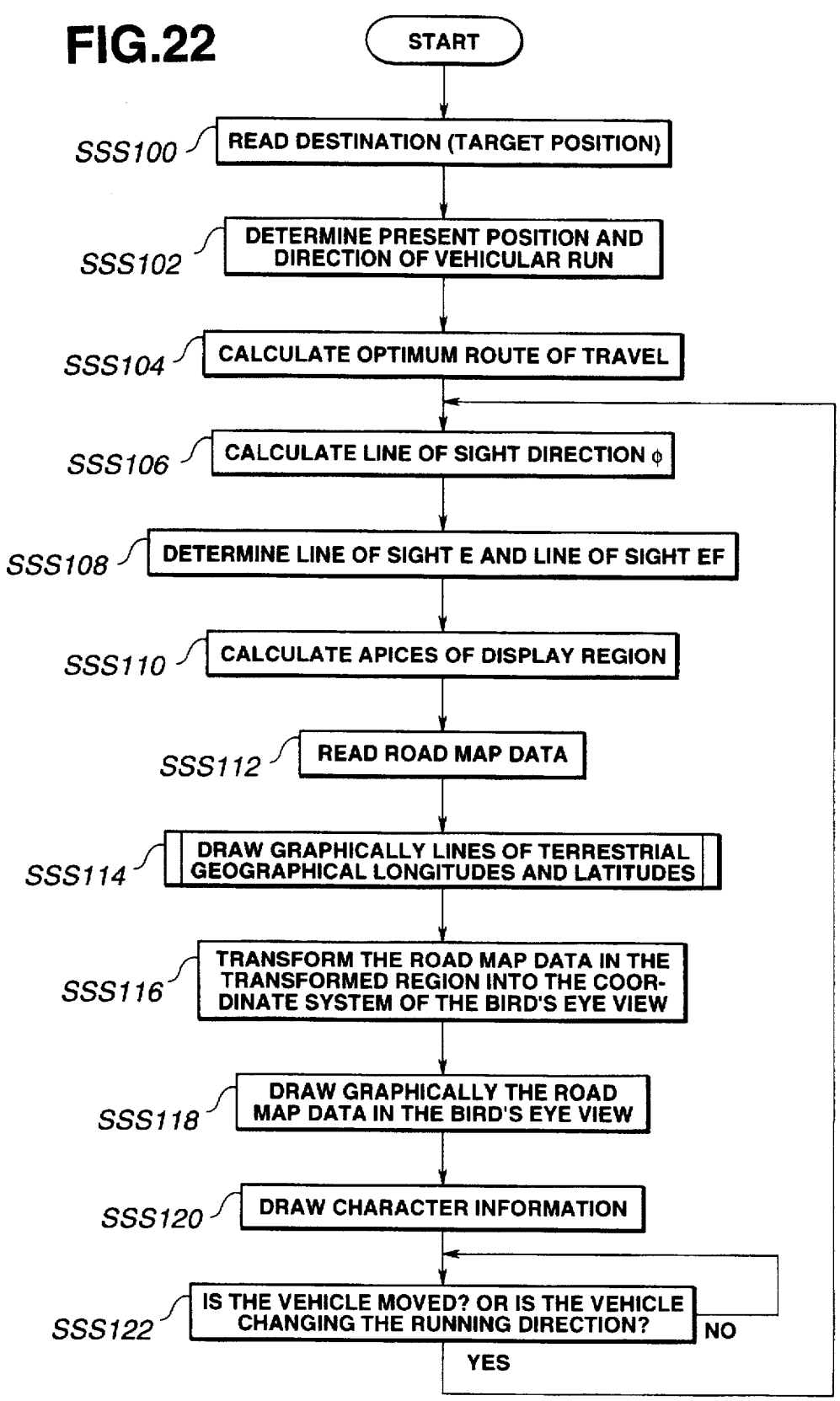

FIG. 22 is an operational flowchart of the road map display program in a case of a third preferred embodiment of the vehicular navigating apparatus according to the present invention.

Figure 23:
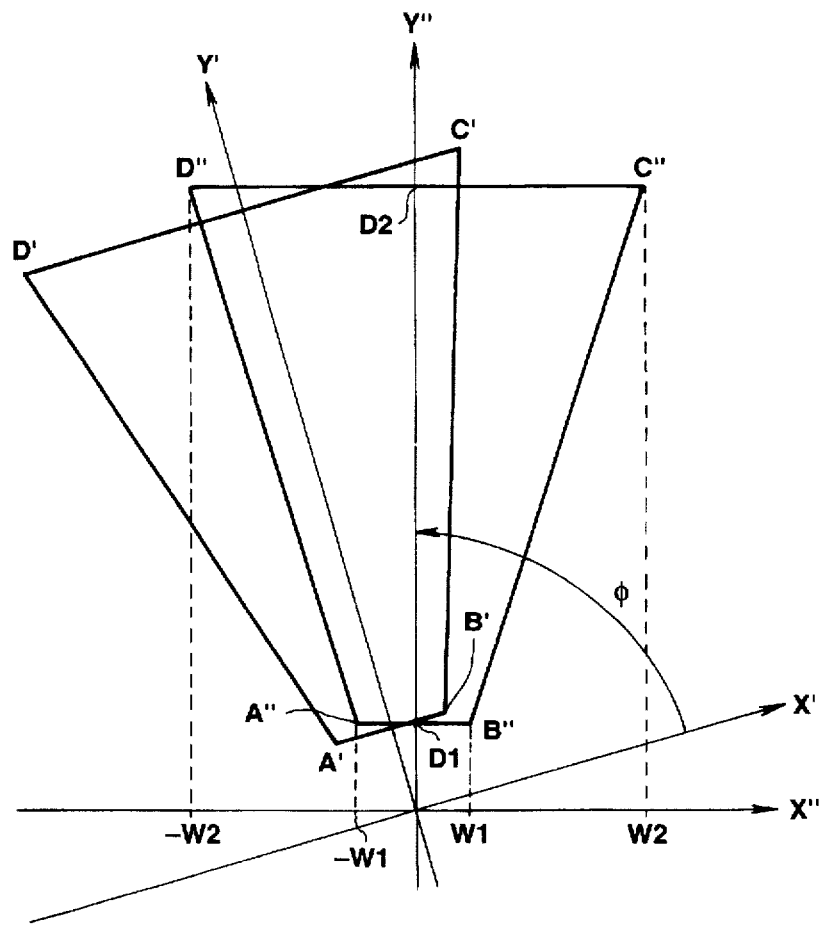

FIG. 23 is an explanatory view of the X"Y" coordinate system with the X'Y' coordinate system in which the XY two-dimensional plane road map coordinate system shown in FIG. 13 parallel translated so that the view point provides the origin and with the X'Y' coordinate system rotated so that the direction of line of sight φ is overlapped on the Y' axis.

Figure 24:
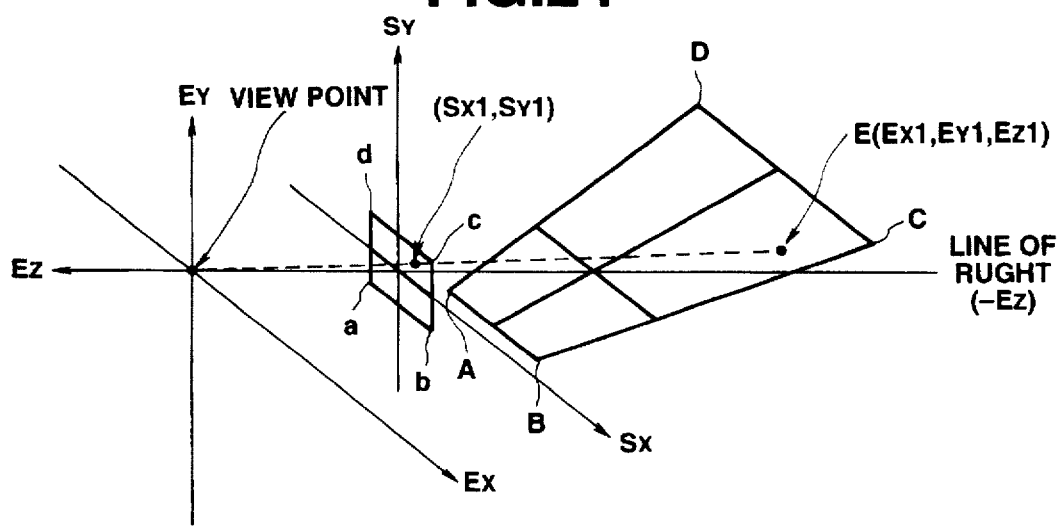

FIG. 24 is an explanatory view for explaining a relationship between an EXEYEZ coordinate system with a view point E as the origin, the line of sight EF as a −Z axis, an SXSY coordinate system with a center of the display frame of the display as the origin, and the display region ABCD.

Figure 25:
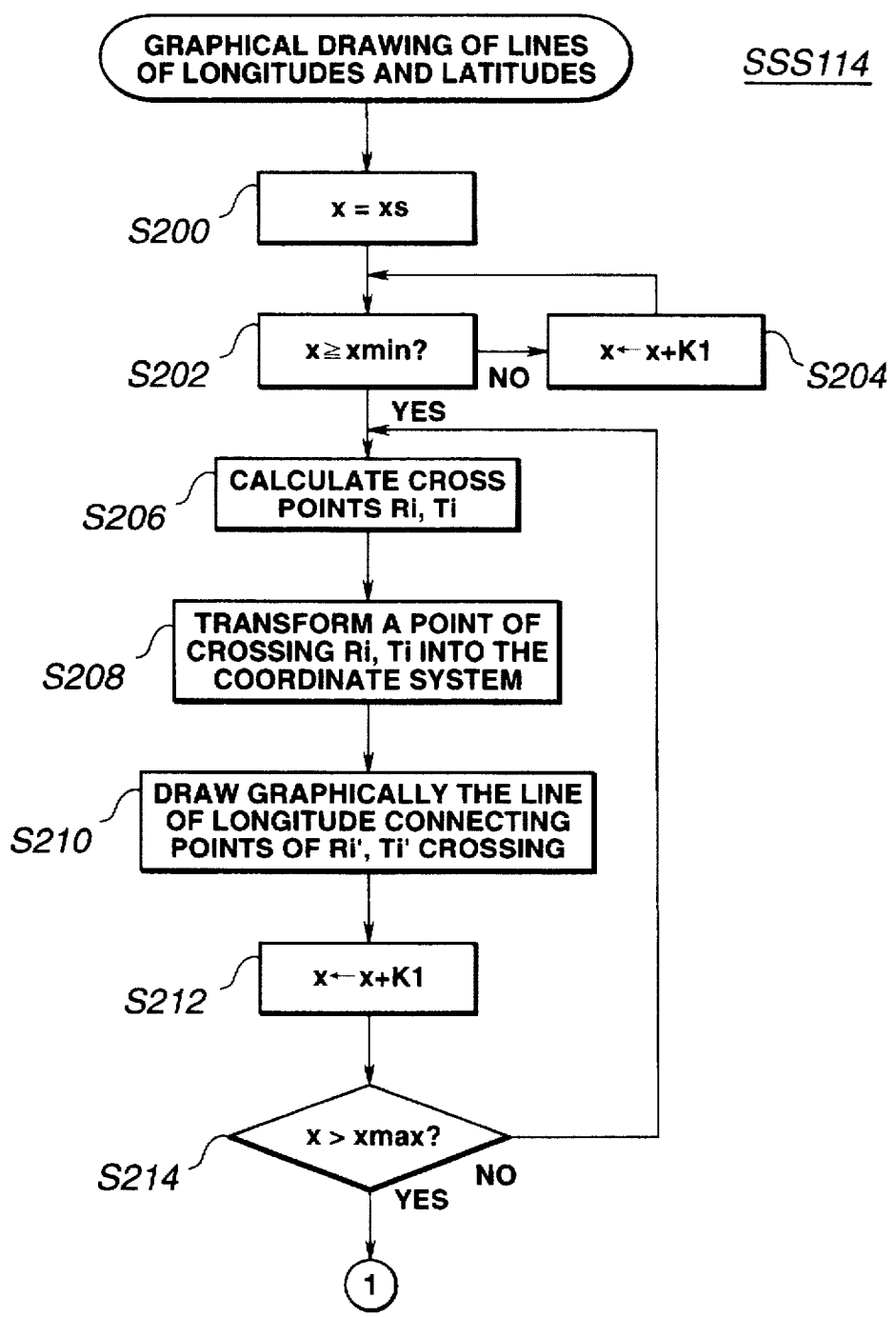
Figure 26:
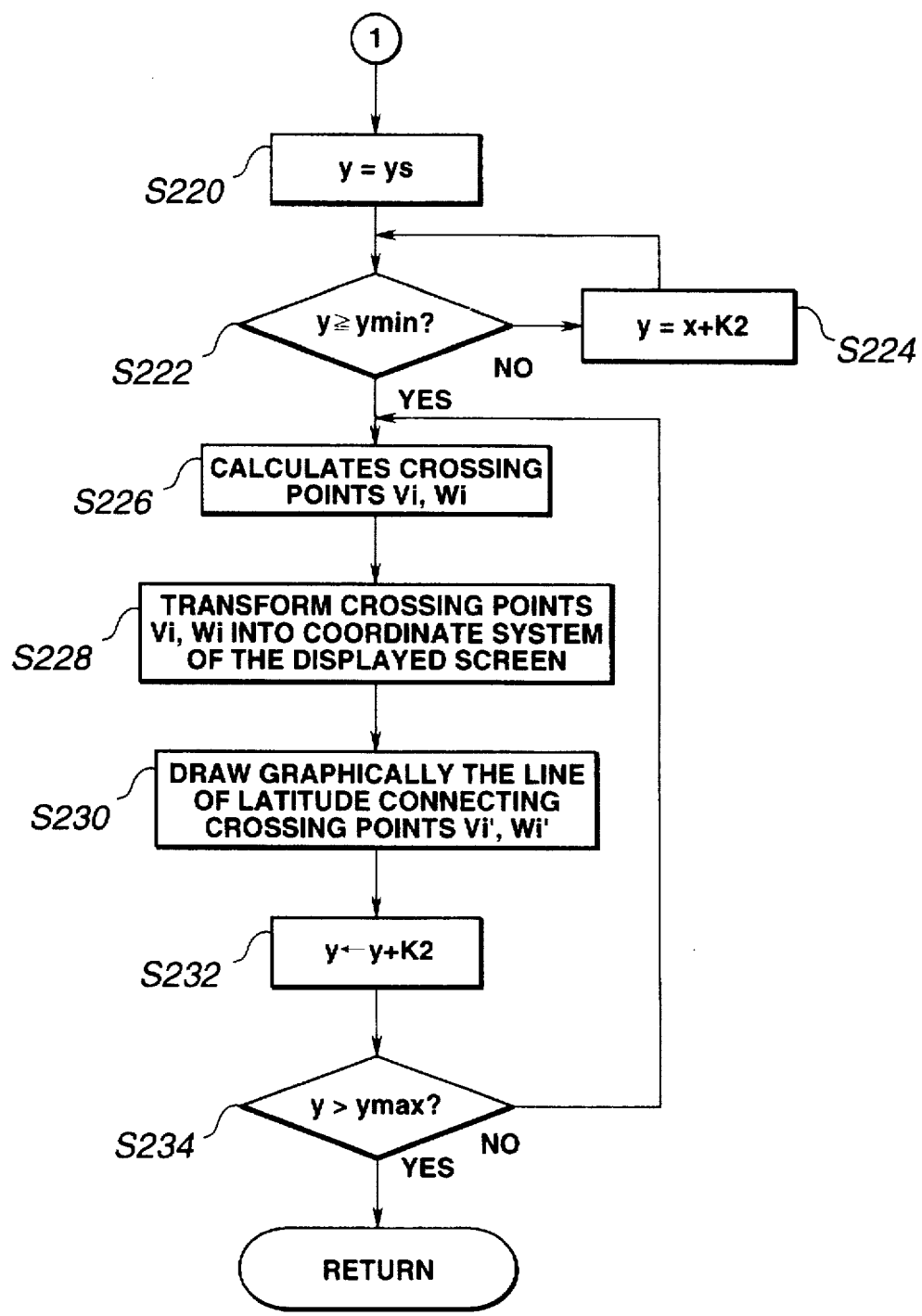

FIGS. 25 and 26 are integrally another operational flowchart for explaining a subroutine of graphical drawing of lines of longitudes and latitudes executed at a step SSS114 of FIG. 22.

Figure 27:
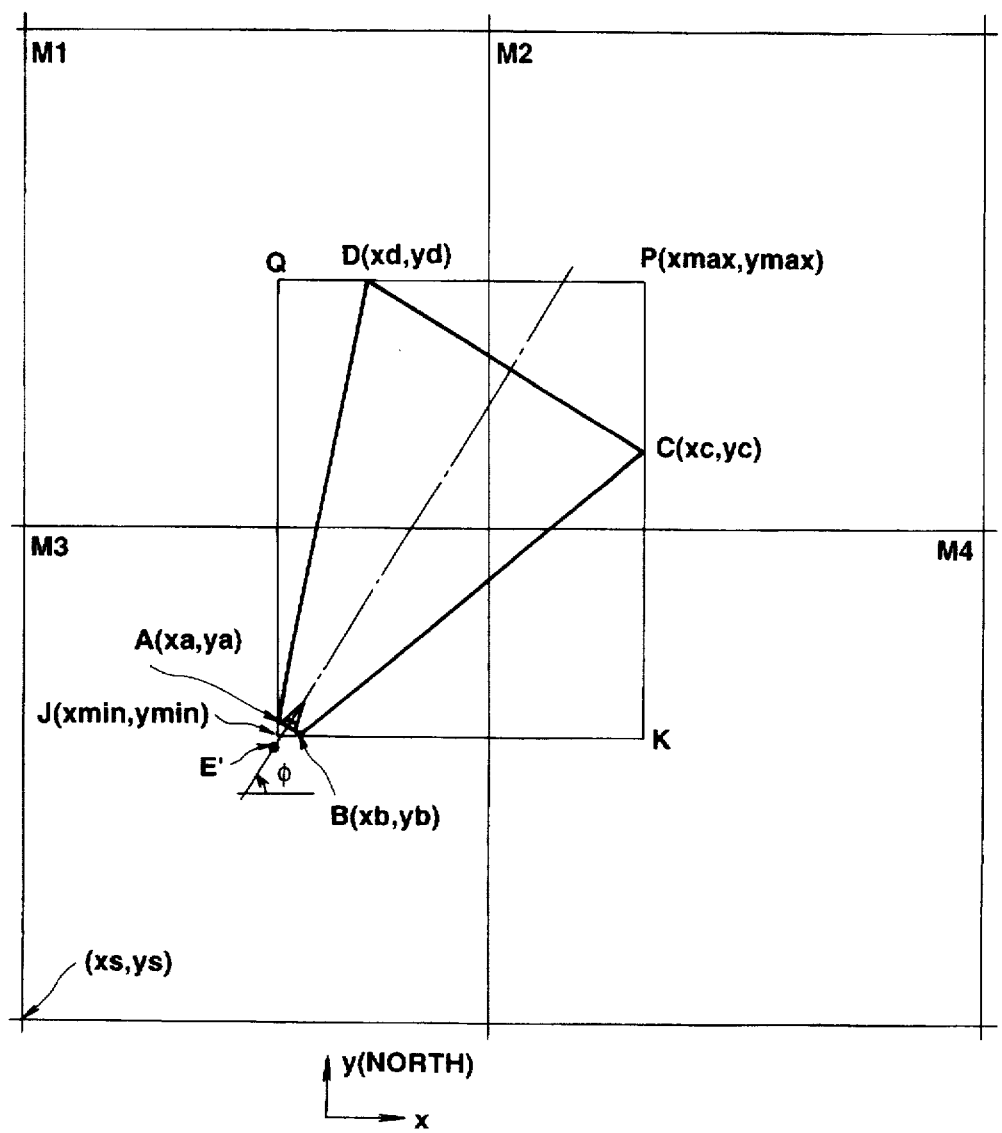

FIG. 27 is an explanatory view for explaining a relationship between the display region ABCD, a region to be transformed JKPQ, and regional meshes M1 through M4.

Figure 28:
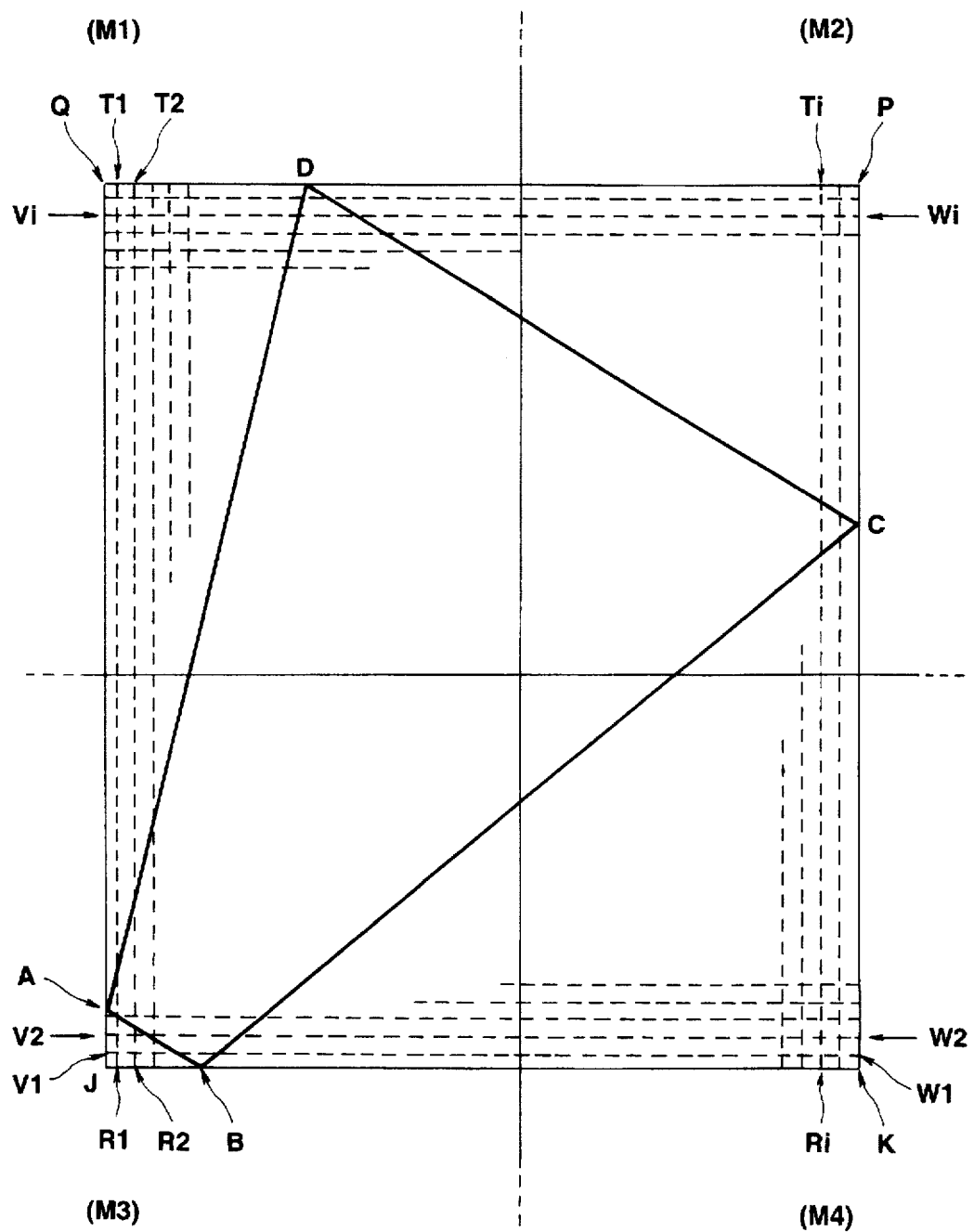

FIG. 28 is an explanatory view for explaining a method of graphically drawing the lines of longitudes and latitudes on the road map in the form of the bird's eye view.

Figure 29:
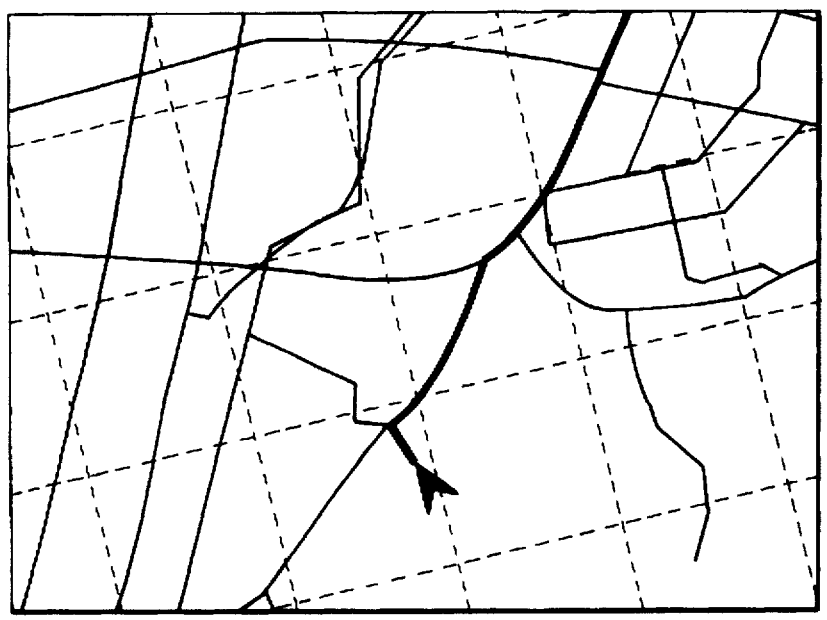

FIG. 29 is an explanatory top view for explaining a comparative example which displays the lines of longitudes and latitudes graphically drawn on the two-dimensional plane road map, the present position of the vehicle and the set route of travel from the present position to the destination.

Figure 30:
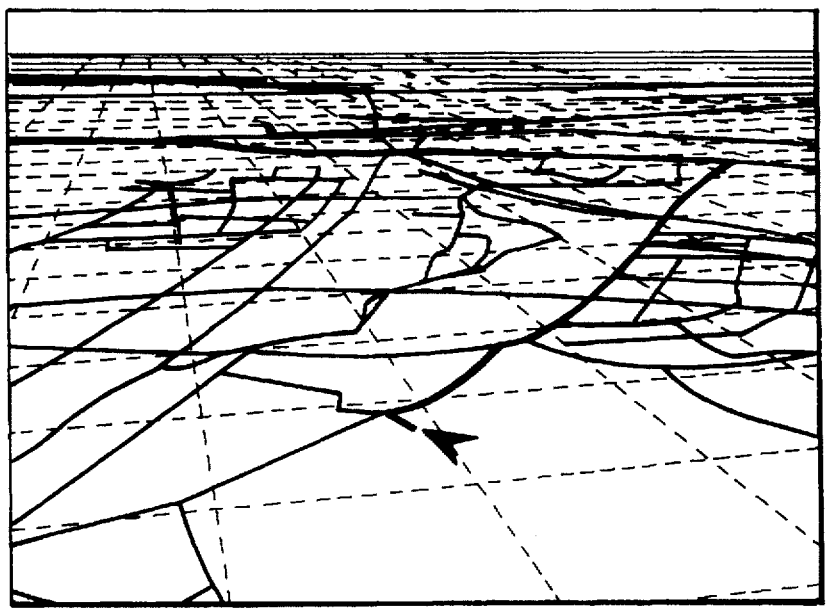

FIG. 30 is an explanatory view for explaining the road map in the bird's eye view executed in the third preferred embodiment on which the lines of longitudes and latitudes, the present position of the vehicle, and the set route of travel to the destination as compared with the two-dimensional road map displayed as shown in FIG. 29.

Figure 31:
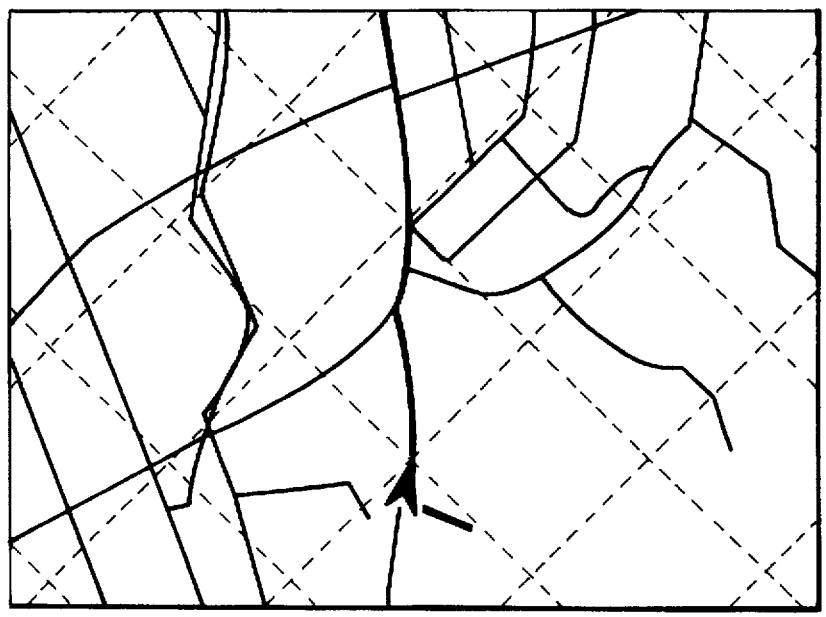

FIG. 31 is an explanatory view of the comparative example of two-dimensional road map shown in FIG. 29 and which indicates that the vehicle is running on a route of travel from the state shown in FIG. 29 to a state in which the vehicle has just passed and turned right from a point of a traffic intersection.

Figure 32:
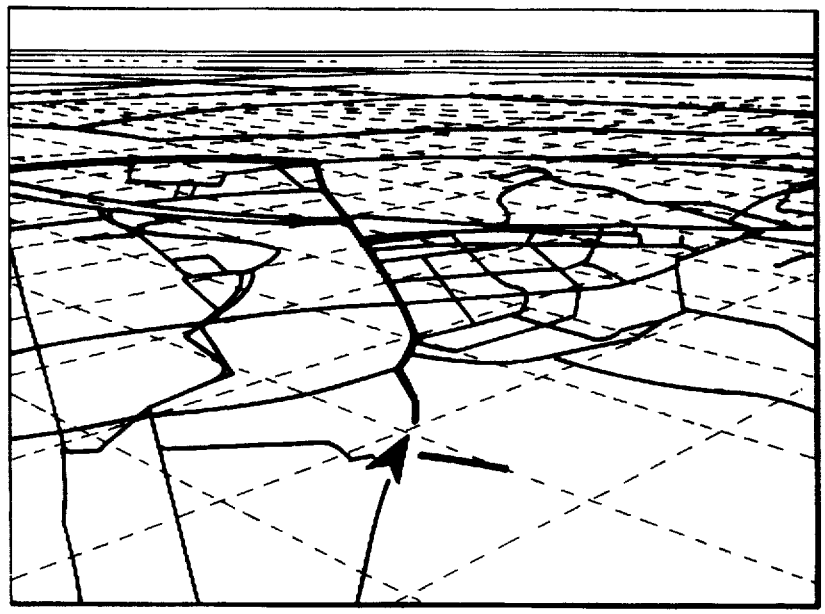

FIG. 32 is an explanatory view of the road map in the form of the bird's eye view executed in the third embodiment in the situation same as that shown in FIG. 31.

Figure 33:
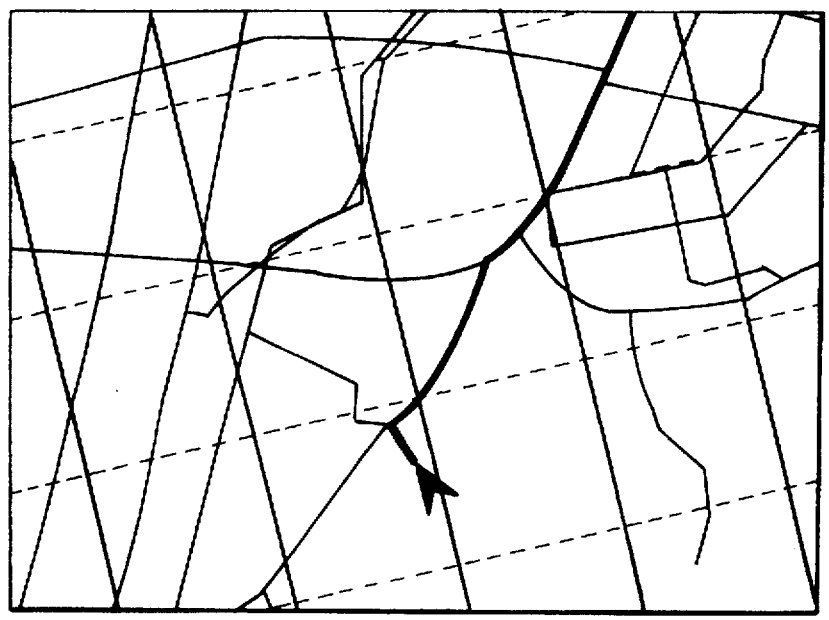

FIG. 33 is an explanatory view of the comparative example of the two-dimensional road map shown in FIG. 29 in which the lines of longitudes are more emphasized than those of the latitudes.

Figure 34:
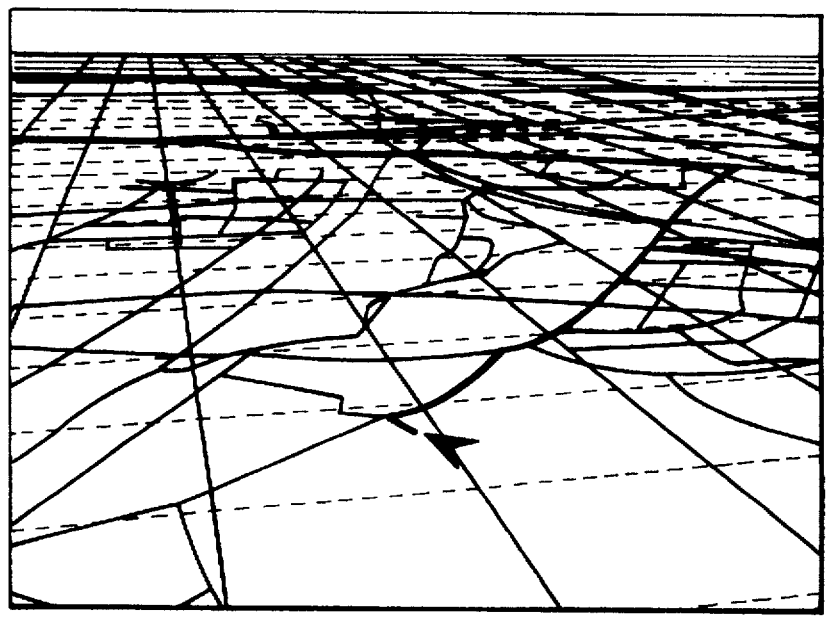

FIG. 34 is an explanatory view of the road map displayed in the form of the bird's eye view in the case of a modification of the third embodiment in which the lines of longitudes are more emphasized than those of the latitudes.

Figure 35:

FIG. 35 is an explanatory view for explaining the two-dimensional road map shown in FIG. 29 in which the lines of the latitudes are more emphasized than those of the longitudes.

Figure 36:
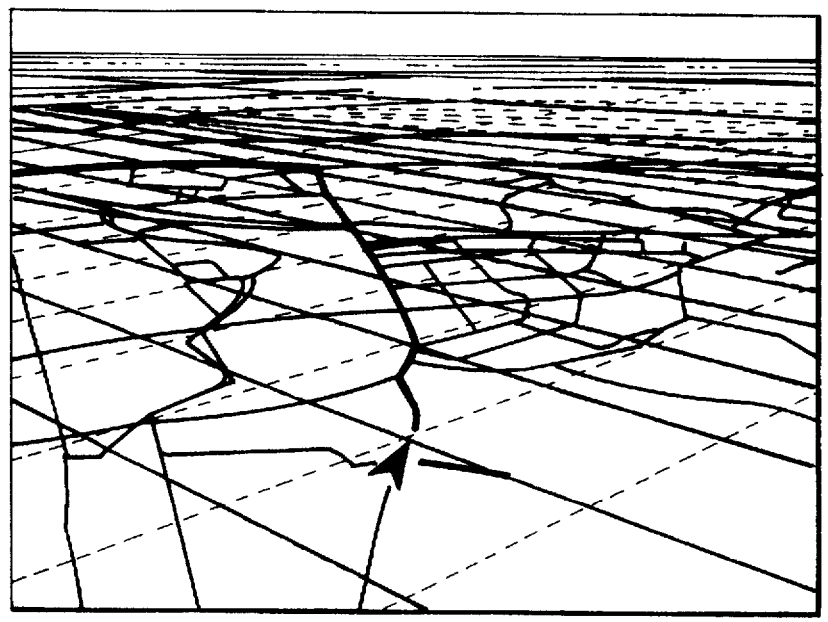

FIG. 36 is an explanatory view for explaining the road map in the form of the bird's eye view shown in FIG. 30 in which the lines of latitudes are more emphasized than those of the longitudes.

Figure 37:
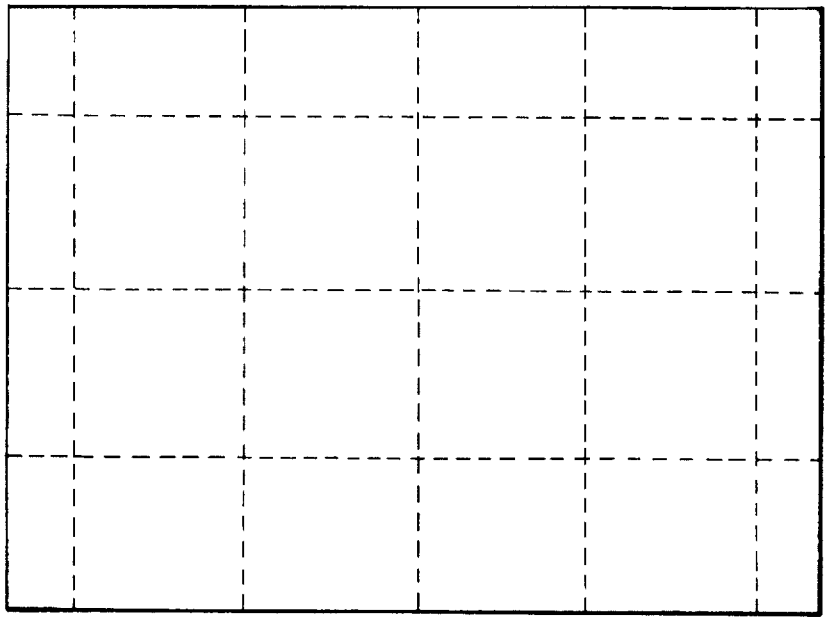

FIG. 37 is an explanatory view for explaining lines of territorial geographical longitudes and latitudes superimposed on the two-dimensional road map with a North direction placed on an upper end of the two-dimensional plane road map.

Figure 38:
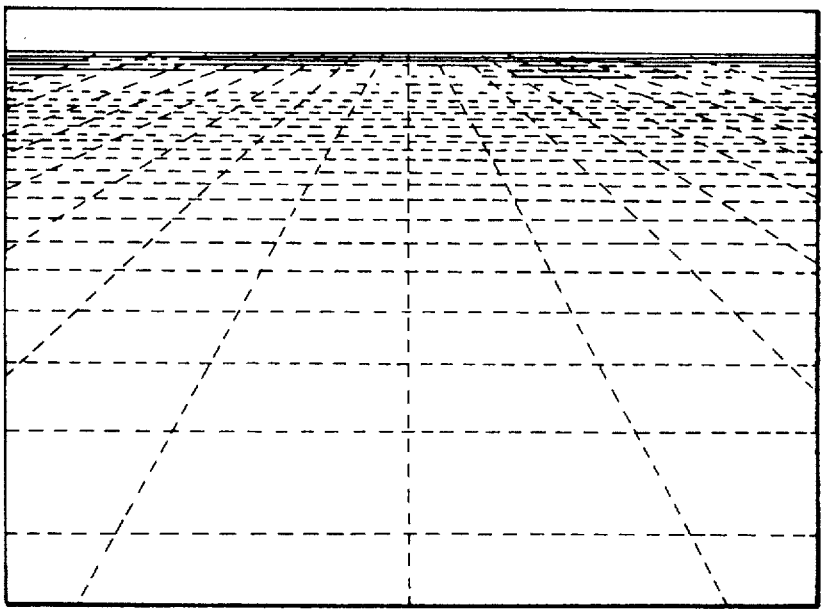

FIG. 38 is an explanatory view for explaining the road map in the form of the bird's eye view on which the lines of longitudes and latitudes are transformed in a case where a true North direction is viewed from a predetermined view point E along a predetermined line of sight EF with the direction of line of sight φ being set as 90 degrees.

Figure 39:
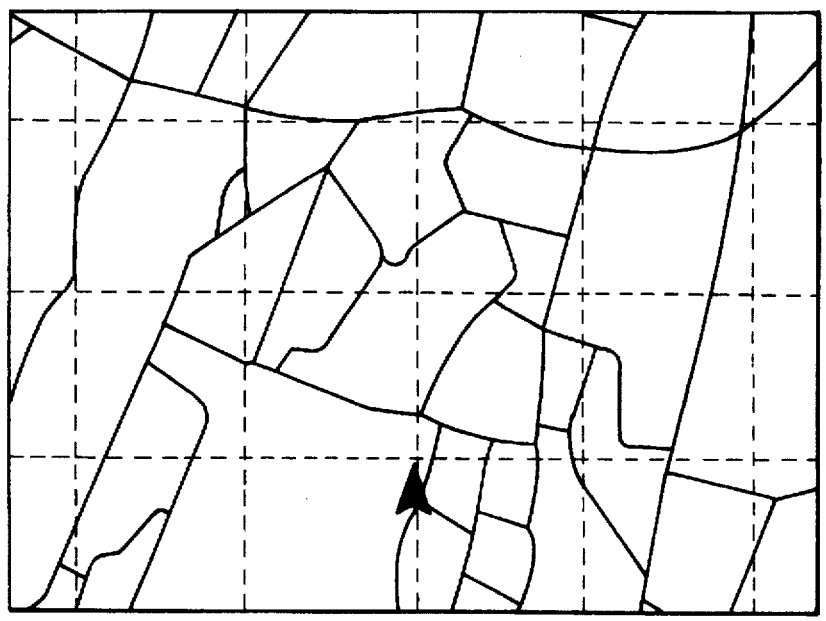

FIG. 39 is an explanatory view for explaining the two-dimensional road map on which the lines of the longitudes and latitudes are superimposed and the present position of the vehicle is graphically drawn.

Figure 40:
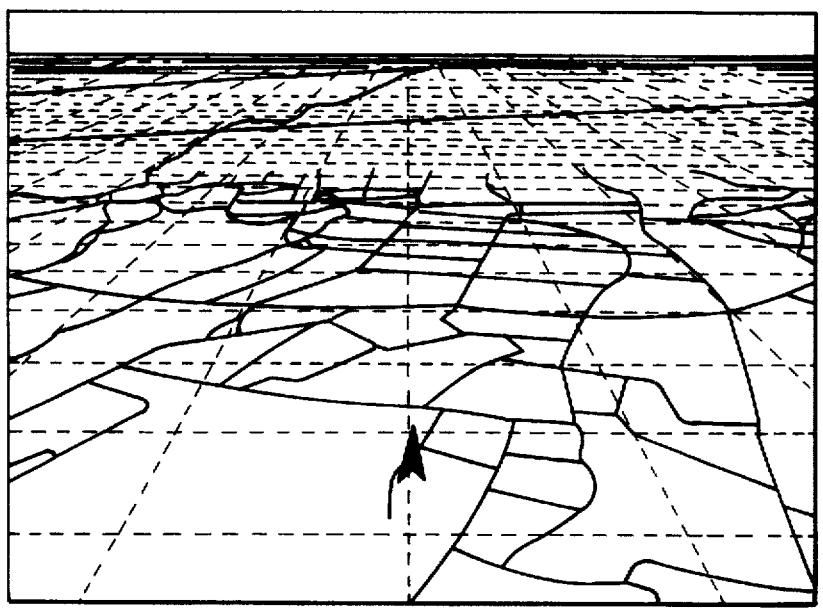

FIG. 40 is an explanatory view for explaining the road map displayed in the form of the bird's eye view in which the road map shown in FIG. 39 is transformed into the bird's eye view under a predetermined condition in the case where the true North direction is viewed from the predetermined view point E along a predetermined line of sight EF with the direction of line of sight φ being set as 90 degrees.

BEST MODE CARRYING OUT THE INVENTION

Reference will hereinafter be made to the drawings in order to facilitate a better understanding of the present invention.

It is noted that the term 'road map' as used in throughout the specification includes an information such as an administrative district and its name of place, a railway, a station name, a principal facility, a lake and swamp, and a scenic spot and place of historic interest in addition to a road information.

(First Embodiment)

Figure 1:
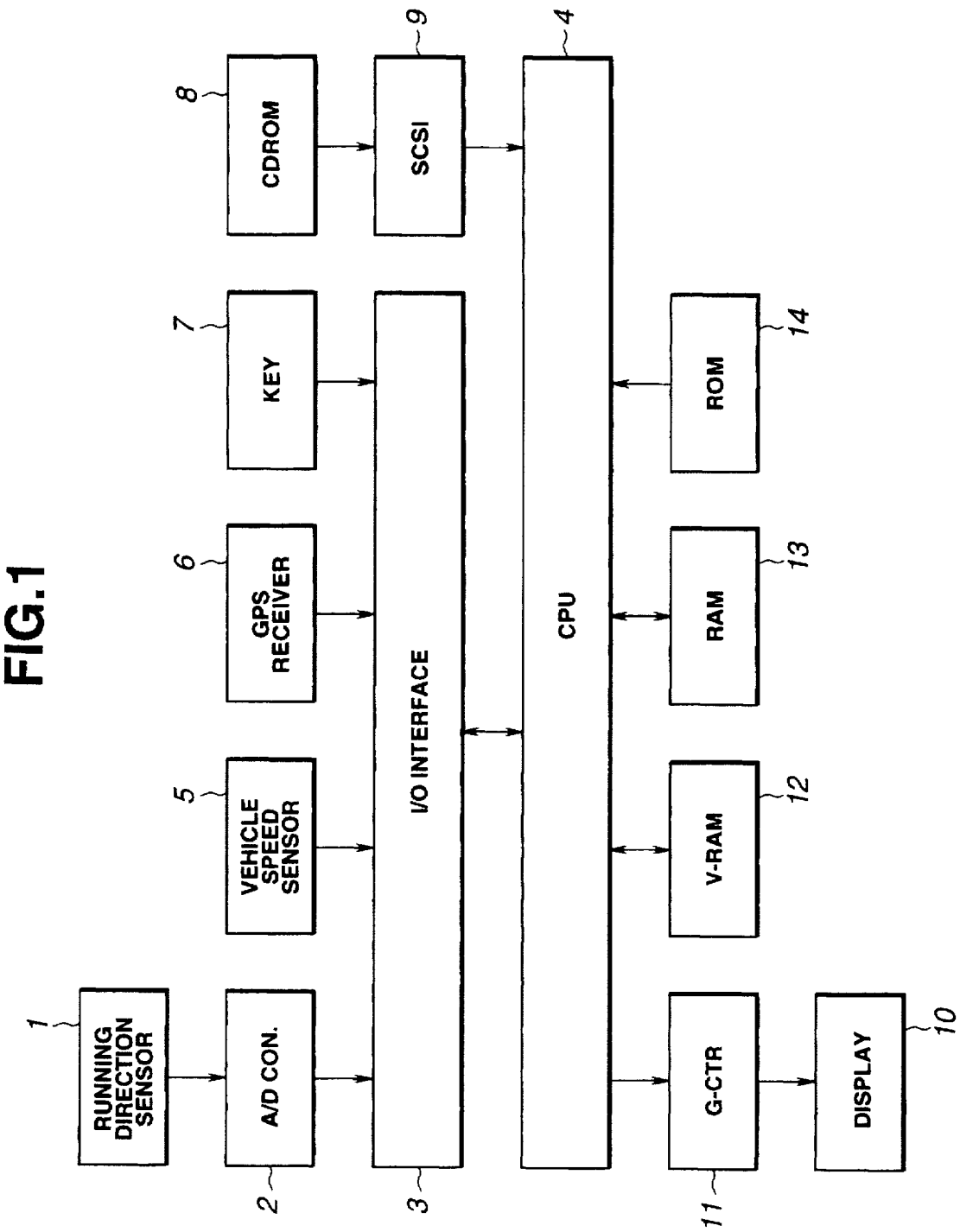
FIG. 1 is a circuit block diagram of a vehicular navigating apparatus in a first preferred embodiment according to the present invention.

FIG. 1 shows a functional block diagram representing a hardware structure of a vehicular navigation apparatus applicable to an automotive vehicle route guidance system in a first preferred embodiment according to the present invention.

The vehicular navigating apparatus in the first embodiment includes a microcomputer and its peripheral circuit.

In FIG. 1, a direction sensor 1 detects a running direction of the vehicle with respect to the North and produces a signal indicating the direction of the vehicular run. The vehicular running direction signal is supplied to an A/D converter 2 and to a CPU 4 via an I/O interface 3. A vehicle speed sensor 5 produces a pulse signal whenever the vehicle runs through a predetermined distance of run, the pulse signal being supplied to the CPU 4 via the I/O interface 3. The CPU 4 counts the number of pulses in the pulse signal supplied from the vehicle speed sensor 5. A GPS (Global Positioning System) receiver 6 is a receiver of an absolute position of the vehicle present position utilizing a plurality of GPS satellites, the information on the present position of the vehicle and forwarding direction of the vehicle being supplied to the CPU (Central Processing Unit) 4 via the I/O interface 3. A key (keyboard) 7 is an operation panel through which a destination (a target position) of the vehicle to which the vehicle is finally to reach is set and the key operated information is supplied to the CPU 4 via the I/O interface 3.

A CDROM (CD-ROM and its drive) 8 is an external memory unit which stores the data on the road maps (geographical road maps) and is connected to the CPU 4 via an interface-purpose SCSI (Small Computer System Interface) controller 9. The CPU 4 commands the SCSI controller 9 to read a road map data having a specified range. A display 10 having an image screen on which the road map is displayed is connected to the CPU 4 via a graphic controller 11. The display 10 displays the road map displayed in the form of the bird's eye view on which a mark (an arrow mark) indicating the present position of the vehicle and an optimum route up to the destination (preferably differently colored bold line) are superimposed.

A V-RAM (Video Random Access Memory) 12 stores temporarily the road map data in the form of the bird's eye view and outputs the road map data to the display in response to an indicate (or display) instruction from the CPU 4. Furthermore, the CPU 4 is connected to a RAM (Random Access Memory), the RAM (Random Access Memory) used for the temporary storage of the various data, and a ROM (Read Only Memory) 14 which stores a predetermined control program as will described later.

The CPU 4 calculates the optimum route from the present position to the destination with a traveling route set processing program, transforms the road map data (in a form of a two-dimensional plane) into that in the form of the bird's eye view, and superimposes the present position of the vehicle and the set optimum route of travel to the destination on the road map displayed in the form of the bird's eye view.

Figure 2:
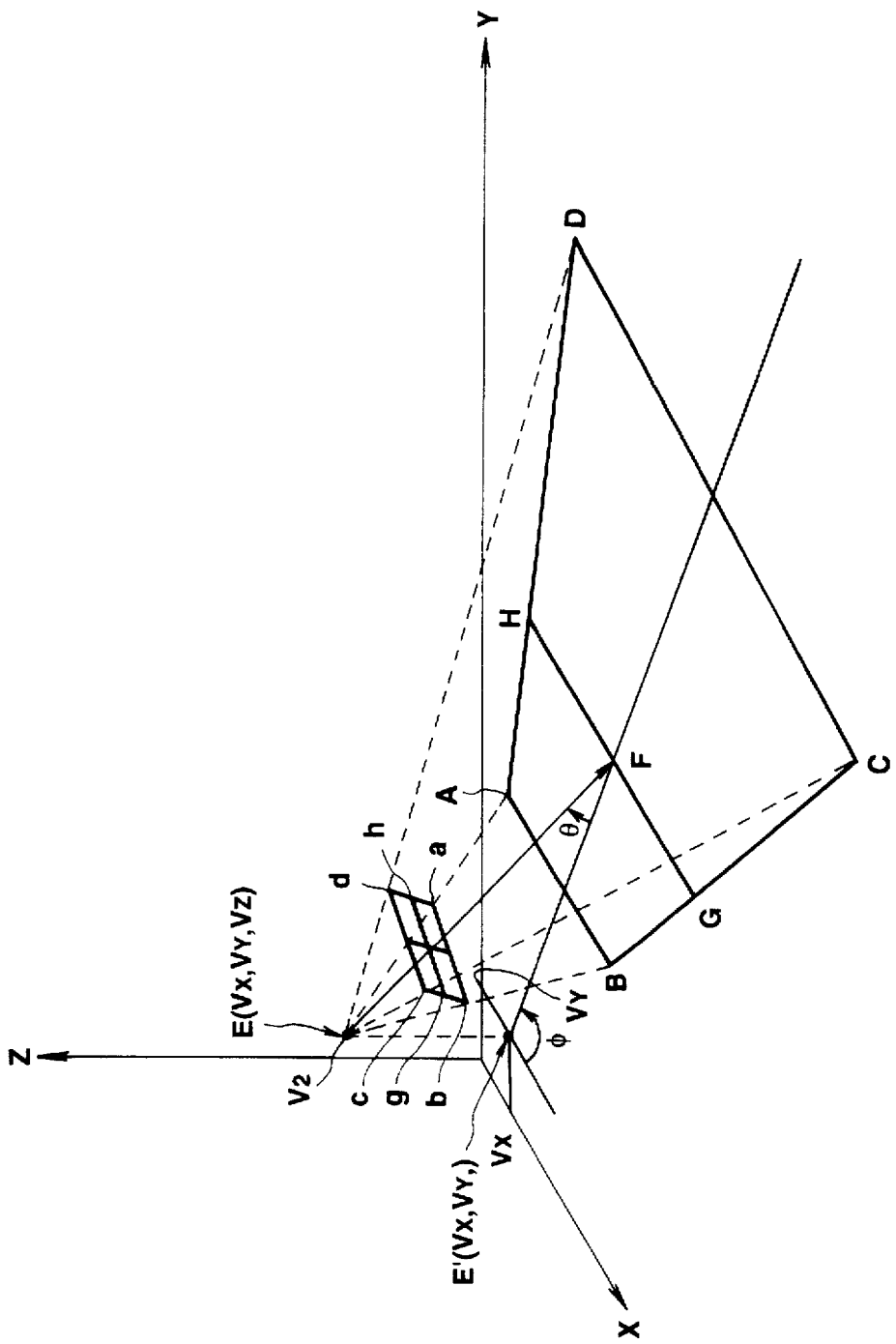
FIG. 2 is an explanatory view for explaining a relationship between a road map in a form of a bird's eye view and a display frame of a display image screen.

FIG. 2 shows a relationship between a conventional road map in the form of top view (two-dimensional plane road map, and hereinafter often merely called a road map in a comparative example), the road map in the form of the bird's eye view, and a display frame abcd.

Suppose that the road map in the comparative example (the road map on the two-dimensional plane) is expressed on an XY plane with the East taken in the direction of +X axis and the North taken in the direction of +Y axis and a three-dimensional coordinate system of XYZ is expressed with an upper sky over a road on the XY plane taken in a positive direction of a Z axis perpendicular to the XY plane.

A view point E ($V_x$, $V_y$, $V_z$) is set at the upper sky over a point of place (E'($V_x$, $V_y$)) which is remote from (behind) the present position F of the vehicle by a predetermined distance in an opposite direction to the destination. Then, suppose that the road map on the XY plane is looked down from the view point E along a line of sight EF. An angle intersected between the line of sight EF and the XY plane is called a looking down angle θ (or angle of visibility). An angle intersected between a straight line E'F which is formed by projecting the line of sight EF onto the XY plane and the positive direction of the X axis is called a direction of line of sight φ.

In the first embodiment, it is supposed that the present position of the vehicle is set as F ($C_x$, $C_y$). Both of a position of the view point E ($V_x$, $V_y$, $V_z$) and the line of sight EF are determined so that the present position of the vehicle is displayed at a center of the display frame abcd shown in FIG. 2.

It is noted that the present position of the vehicle is consequently placed at a center of a side GH in the road map region ABCD to be displayed.

It is also noted that the road map data stored in the CDROM 8 in FIG. 1 are classified and administrated into minor blocks (hereinafter, referred to as regional meshes) prescribed in, for example, JIS-X041 for all lands of Japan (national) proper. The reading of any one of the road map data from the CD-ROM (CDROM) 8 is carried out in a unit of each corresponding one of the regional meshes.

Figure 3:
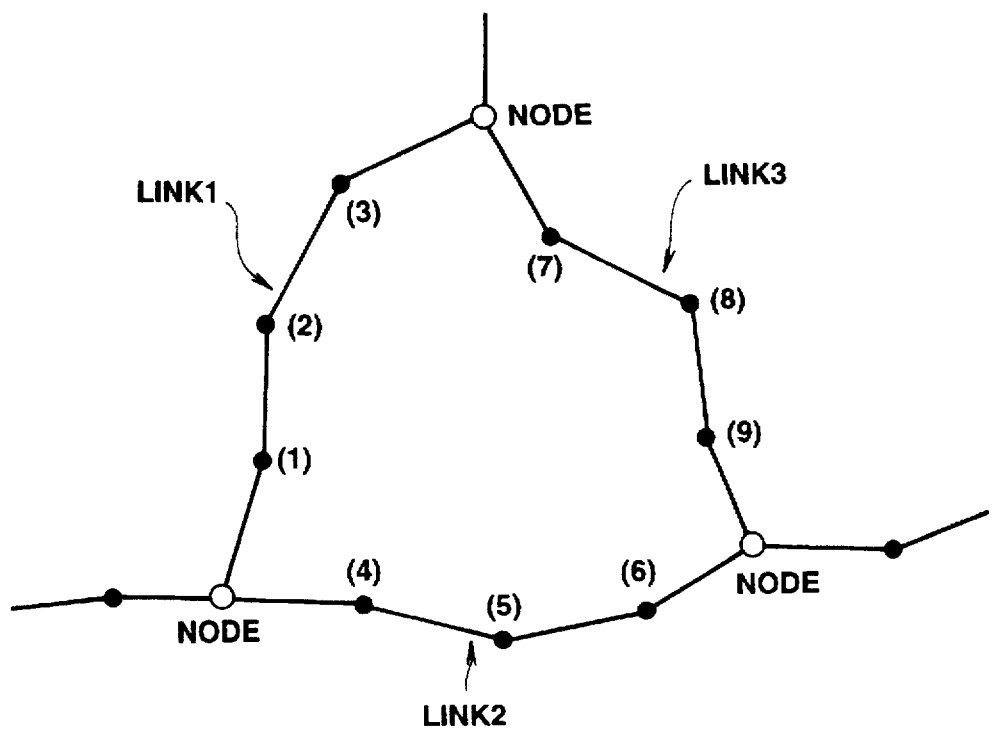
FIG. 3 is an explanatory view on a road data included in a road map data stored in a memory unit.

FIG. 3 shows an example of a road data.

Each of the road data is constituted by a plurality of points (hereinafter, also referred to as nodes or points of interpolations) and lines (hereinafter, also referred to as links) connecting mutually the points.

As shown in FIG. 3, the nodes representing traffic intersections (circle points), the interpolation points representing interpolations between bend (curved) points of roads (denoted by black points (1), (2), (3), ---), the links connecting between the mutually adjacent interpolation points and connecting between the nodes are date formatted as the road data.

As shown in Table 1, the formatted data described above are stored together with the XY coordinates of a start point for each link, an end point for each link, and the interpolation points for each link and attribute information such as a hierarchical information such as a hierachial level (level at a tree structure).

In addition, the roads are divided into five stages of hierarchical levels according to the kinds of the roads as shown in Table 2.

The administration district names are classified into the five stages of hierachial levels as shown in Table 3.

Furthermore, the administrative district names are stored together with the XY coordinates of the display positions and attribute information on hierarchical levels.

Such polygons as those lakes and swamps, parks, and principal facilities which occupy the relatively wide areas on each road map are classified into the five stages of hierarchical levels according to the width of each administrative district as shown in Table 5.

Figure 4:
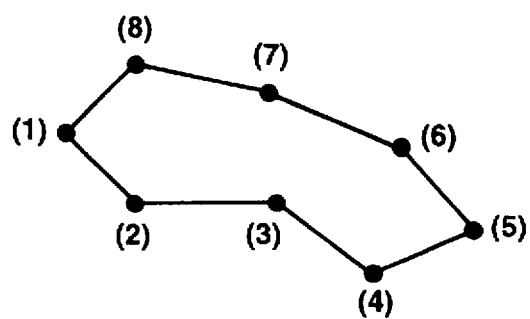
FIG. 4 is an explanatory view on a display example of a polygon such as a lake.

As shown in Table 6, the polygons are stored together with the bending point (refer to FIG. 4) when an outer periphery of the polygon is straight line approximated and the attribute information such as the hierarchical levels.

Such other information to be displayed on each road map as railways, station name, principal facilities, scenic spots and places of historic interest are all classified into predetermined hierarchical levels. These other pieces of informations are stored together with the attribute information such as the XY coordinates indicating these positions and the attribute information such as the hierarchical levels.

The hierachial levels of the respective road map data are referred to in order to determine whether the road map data should be displayed according to the display frame abcd when the road map data in the form of the bird's eye view are displayed through the display 10.

The data in all hierachial levels from 1 to 5 are displayed on a lowest region of the display frame abcd. For a higher display region of the frame abcd data having a lower hierarchical level (large in the level value) is not displayed so that only the data having the hierarchical level 1 is displayed at an uppermost region of the display frame abcd, as described below with respect to FIG. 5. Refer to Table 7.

Figure 5:
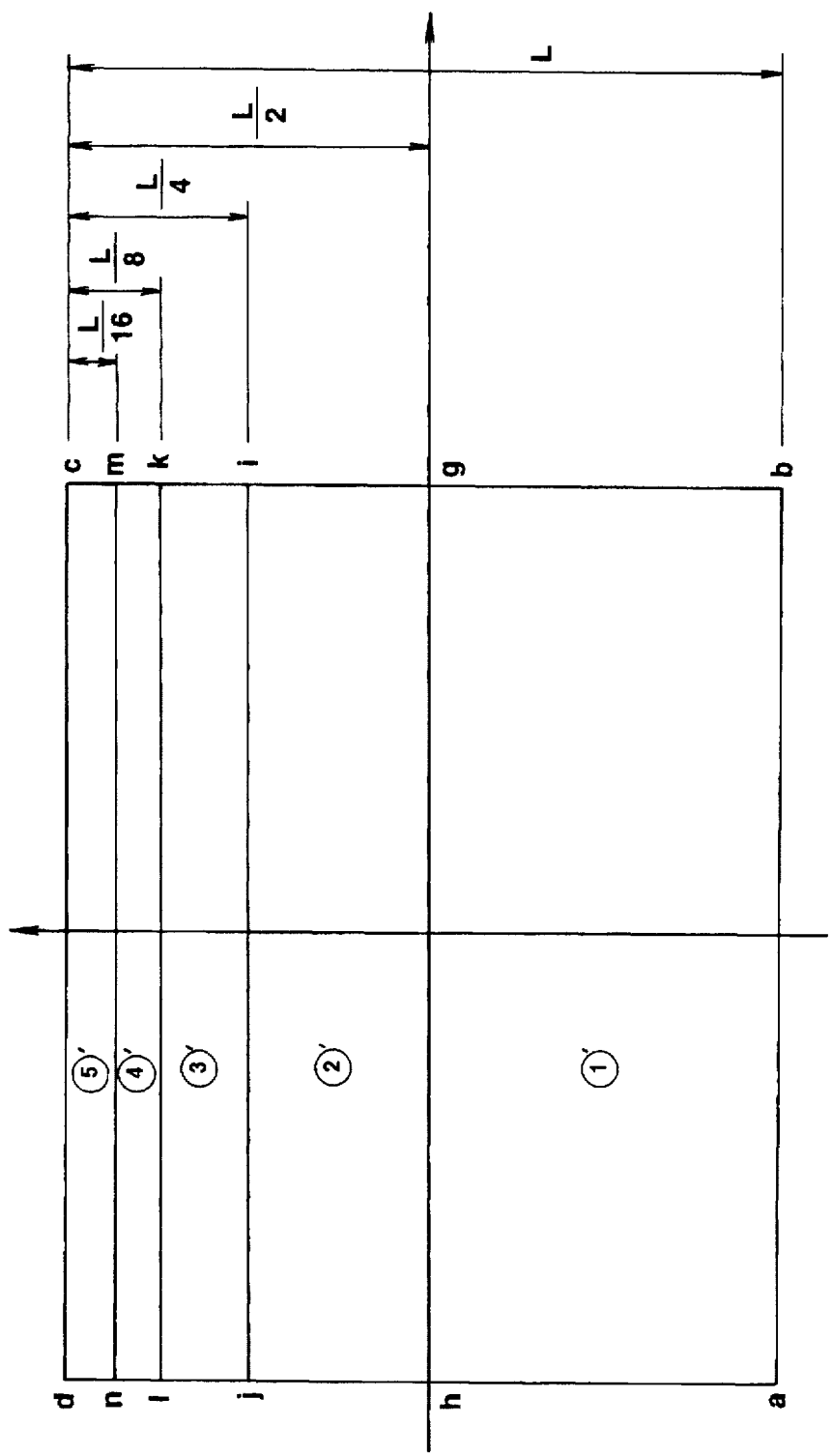
FIG. 5 is an explanatory view on a display region division example of the display frame of the image screen of a display used in the first embodiment shown in FIG. 1.

In other words, in the first embodiment, the display frame abcd of the display 10 is divided into a plurality of regions, as shown in FIG. 5.

That is to say, the display frame abcd is equally divided into half, i.e., the lower half region of abgh and the upper half region hgcd. The lower half region abgh is called a lowest display region ①'. Next, the upper half region hgcd is equally divided into half, i.e., the upper lower (middle) region hgij ②' and the upper upper region jicd. Furthermore, the upper upper region jicd is equally divided into half, i.e., the upper upper lower (third uppermost) region jikl ③' and upper upper upper region lkcd. Similarly, the upper upper upper region lkcd is equally divided into half, i.e., the upper upper upper upper lower (second uppermost) region lkmn ④' and the upper upper upper upper (an uppermost) region nmcd ⑤'. In FIG. 5, L denotes a length in the longitudinal direction of the display frame abcd.

In this way, the five regions are formed in such a sequence as ①' ②' ③' ④' and ⑤' from the lowest region of the display frame abcd.

Figure 6:
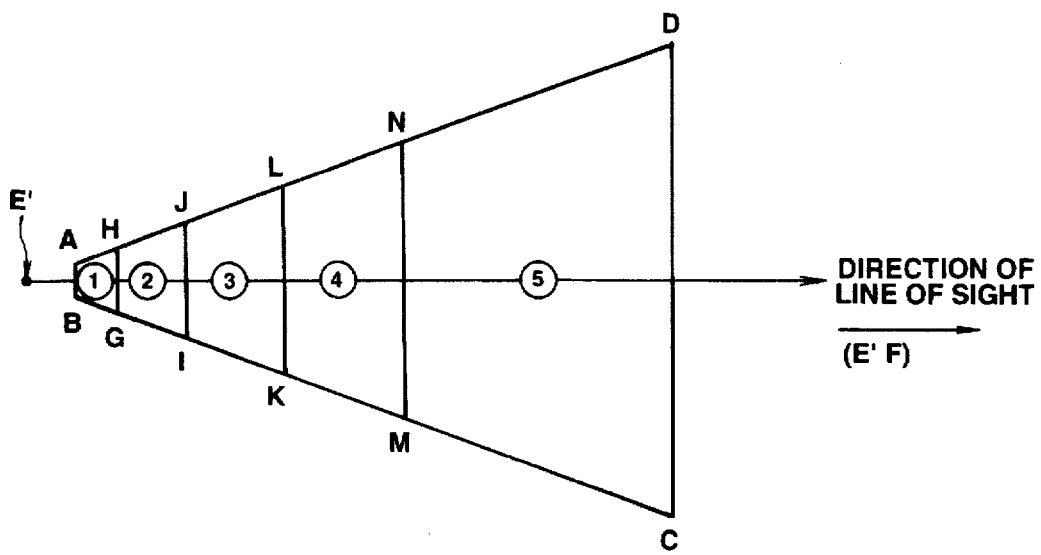
FIG. 6 is an explanatory view on bird's eye view regions on any one of stored road maps corresponding to display frame divided regions on the image screen shown in FIG. 5.

FIG. 6 shows the display region ABCD (trapezoid shape) on the road map expanded on the VY plane shown in FIG. 2.

It is noted that each region of ①', ②', ③', ④', and ⑤' in the above-described frame abcd sequentially corresponds to one of the five regions ①, ②, ③, ④, and ⑤ within the display region ABCD of FIG. 6.

One of the regions ① (ABGH) which is nearest to the projected point E'($V_x$, $V_y$) onto the XY plane from the view point E is displayed on the lowest display region abgh ①' of the display 10. The display region ① has the narrowest area from among the five display regions shown in FIG. 6. However, the display region ①' of the display 10 corresponding to the narrowest display region ① has the widest area from among the five regions shown in FIG. 5. In other words, the road map having the narrow range surrounding the present position of the vehicle is expanded and displayed on the widest region of the display 10. On the contrary, the display region ⑤ in FIG. 6 has the region having the widest area from among the five display regions ① through ⑤ and, in addition, the display region ⑤' of the display 10 corresponding to the display region ⑤ has the narrowest area from among those of the five regions ①' through ⑤'. In other words, the road map part surrounding the destination is compressed (scale reduced) and displayed into the narrowest region of the display 10 (image screen).

Figure 8:
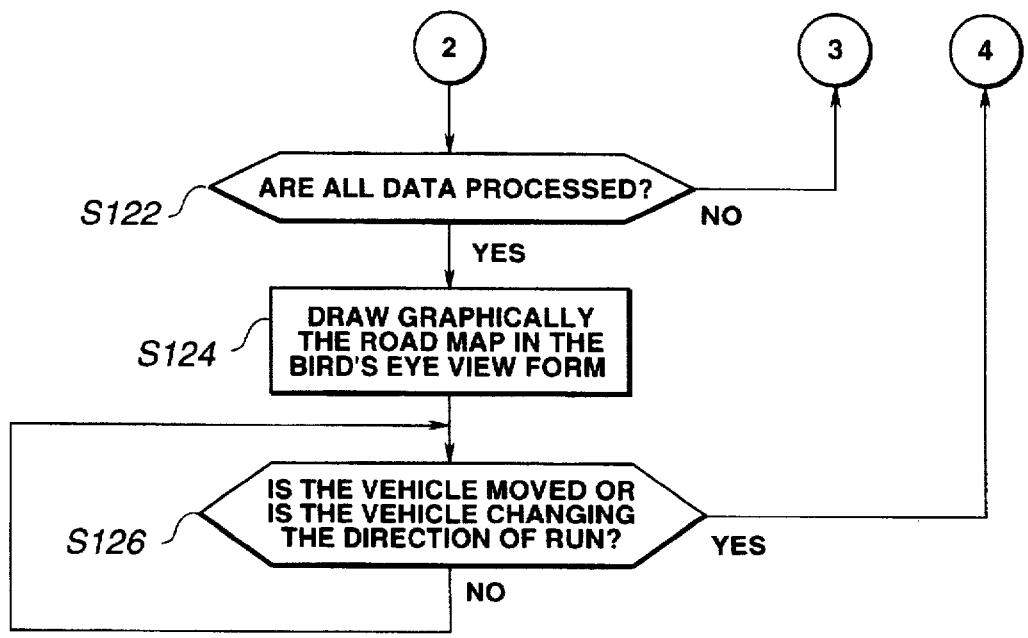
FIG. 8 is an operational flowchart which is integrated to that shown in FIG. 7.
Figure 7:
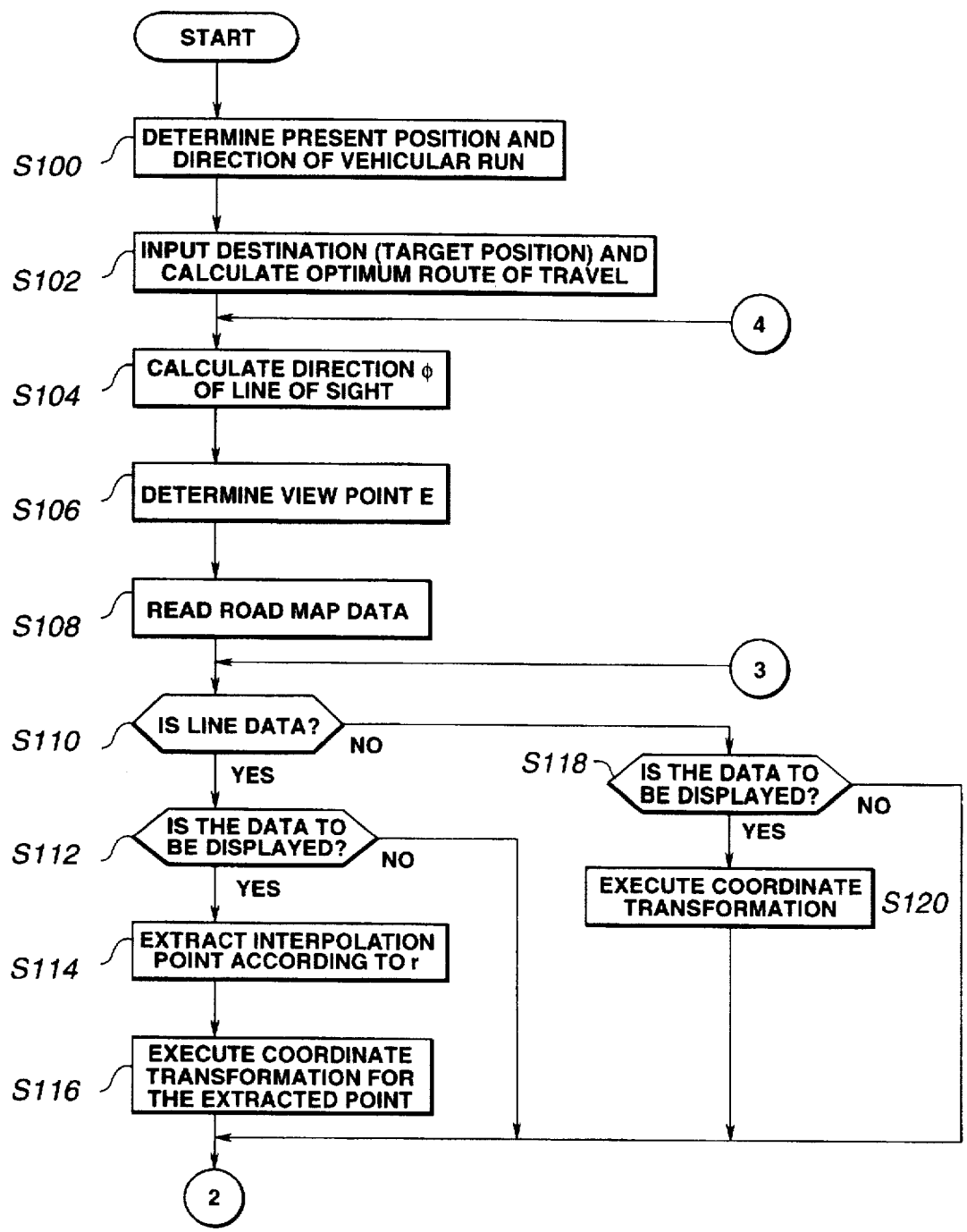
FIG. 7 is an operational flowchart indicating a road map display program executed in the first embodiment.

An operation of the vehicular navigating apparatus in the first embodiment will be described with reference to an operational flowchart shown in FIGS. 7 and 8. FIGS. 7 and 8 indicating integrally a road map display program executed in the first embodiment shown in FIG. 1.

When a main switch (not shown) of the key 7 is turned on, the CPU 4 starts the execution of the program shown in FIGS. 7 and 8.

At a step S100, the CPU 4 reads the present position of the vehicle and the forwarding direction of the vehicle from the direction sensor (running direction sensor) 1 and from the GPS receiver 6.

The present position may be determined by a stand-alone navigating method, by a GPS navigating method, and/or by both methods (hybrid navigating method) simultaneously. The hybrid navigating method is exemplified by a U.S. Pat. No. 4,899,285 issued on Feb. 6, 1990 (the disclosure of which is herein incorporated by reference). At the stand-alone type navigating method, the CPU 4 calculates a running locus of the vehicle on the basis of forwarding direction detected by the direction sensor 1 and a running distance measured by counting the pulse number of the pulse signal from the vehicle speed sensor 5 and specifies the present position through a map matching technique.

The latter navigating method uses the present position and forwarding direction calculated by the GPS receiver 6.

At the next step S102, the CPU 4 reads the destination information set through the key 7 by a viewer (generally, a vehicle driver) and calculates an optimum route of travel from the present position to the destination using a well known route searching method.

The route searching method is exemplified by a U.S. Pat. No. 5,371,678 issued on Dec. 6, 1994 (the disclosure of which is herein incorporated by reference).

At a step S104, the CPU 4 calculates the direction φ of the line of sight EF shown in FIG. 2. The direction of the line of sight φ may be set in a direction such that a distance of the displayed optimum route displayed on the display 10 (image screen) becomes maximum, may be set merely to the direction of the forwarding direction, or alternatively be set merely to the direction toward which the destination is present.

At a step S106, the CPU 4 determines the position of the view point E ($V_x$, $V_y$, $V_z$) so that the present position F ($C_x$, $C_y$) of the vehicle is positioned at a center of the display frame abcd of the display 10 (refer to FIG. 2). It is noted that the Z axis coordinate $V_z$ of the view point E and the looking down angle θ are previously set.

If the view point E and the direction of line of sight φ are determined, the relationship between the display frame abcd of the display 10 and the display region ABCD on the road map is determined. That is to say, the coordinates of apices of A, B, C, and D of the display region ABCD on the XY plane are derived. At a step S108, the CPU 4 reads the road map including the display region ABCD of FIG. 6 from among the road maps stored in the CDROM 8 in the unit of each corresponding of the regional meshes and stores the read road map data into the RAM 13.

At a step S110, the CPU 4 fetches an arbitrary data from among the road map data stored in the RAM 13 and read from the CDROM 8 and determines whether the fetched data is the line data such as any one of the links or the railways. If the CPU 4 determines that the data is the line data (Yes), the routine goes to a step S112. If the CPU 4 determines that the data is not the line data but a data such as a character or polygon (No), the routine goes to a step S118.

It is noted that, in the first embodiment, the following process is carried out when the CPU 4 has commanded to display the road map formed in the bird's eye view on the image screen of the display 10:

1) The CPU 4 determines which of hierarchical levels the respective road map data should be displayed on the respective display regions ①', ②', ③', ④', and ⑤' on the basis of the positions of display regions ①', ②', ③', ④', and ⑤' on the display 10 and the hierarchical levels of the corresponding road map data. In the first embodiment, the hierarchical levels of the road map data to be displayed on the respective regions ①', ②', ③', ④', and ⑤' of the display 10 are determined as shown in Table 7.

Namely, all of the data having the hierarchical levels 1 through S are displayed on the lowest region ①' of the display 10, the data having the hierarchical levels from 1 through 4 are displayed on the middle region ②', the the data having the hierarchical levels from 1 through 3 are displayed on the third uppermost region ③', the data having the hierarchical levels from 1 to 2 are displayed on the second uppermost region ④', the data having the highest hierachial level of 1 only are (or is) displayed on the uppermost region ⑤ as shown in FIG. 5 and Table 7. In other words, the most detailed road map data are displayed on the part of the road map surrounding the present position F of the vehicle. As the distance from the present position F of the vehicle to the point of place to be displayed becomes long, only the road map data having the higher degree of display priority are displayed sequentially. (The hierarchical levels indicate degrees of display priorities). Consequently, the viewer can recognize that the detailed road situations surrounding the present position of the vehicle can be confirmed and the general road situations surrounding the destination far away from the present position F can easily be viewed.

2) For the line (line image) data such as the roads and railways within the road map data, an interval of the interpolation points at which the line data constituted by the interpolation points are extracted is controlled according to each position of the display regions ①', ②', ③', ⑤', and ⑤' on the display frame abcd.

A reason of controlling the interval of points at which the line data are extracted (also, called thinning out) will be explained with reference to FIGS. 9A and 9B.

Suppose now that the road map is displayed in the form of the bird's eye view without execution of controlling the interval of points at which the line data are extracted.

Figure 9A:
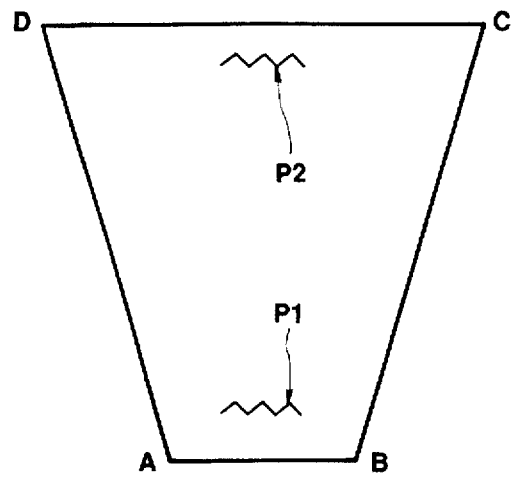
FIGS. 9A and 9B are explanatory views for explaining a thinning out (a control of an interval of points at which a point constituting a line data is extracted and the term of thinning out will be described in the first embodiment) of a line data used in the first embodiment.

Suppose that a road P1 is present around the present position of the vehicle within the display region ABCD on the road map shown in FIG. 9A and another road P2 is present at an upper part of the display region ABCD around the destination shown in FIG. 9A. These roads P1 and P2 are displayed within the display frame abcd of the display 10 as shown in FIG. 9B. That is to say, the road P1 around the present position of the vehicle is expanded (enlarged) and displayed on the lowest region of the display frame abcd of the display 10. On the other hand, the road P2 around the destination on the road map is compressed (reduced) and displayed on the upper (generally uppermost) region of the display frame abcd of the display 10, as appreciated from FIG. 9B.

Figure 9B:
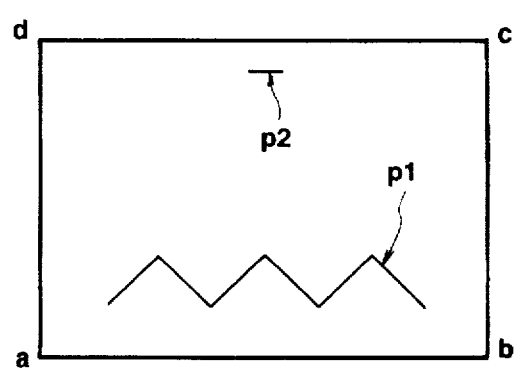

As appreciated from FIGS. 9A and 9B, in the road map displayed in the form of the bird's eye view, such a road as having a zigzag shape is viewed as if it were a short straight line as the road becomes far away from the present position of the vehicle and is approached to the destination. In other words, it is appreciated that no problem occurs even if the points of interpolations from among the road map data shown in Table 1 and FIG. 3 are extracted at constant intervals of points as a road is placed at any point of place which becomes far away from the present position, for the line data constituted by the node(s), point(s) of interpolation (s), and link(s) connecting these nodes and interpolation points.

Consequently, a graphical drawing processing for unnecessary line data becomes unnecessary and a time duration during which the graphical drawing for the line data is carried out can accordingly be shortened. Then, a quick updating of the road map display in the form of the bird's eye view can be achieved along with the movement or turning of the vehicle.

The control of the interval of points at which the line data are extracted is carried out according to a previously set percentage of controlling of the interval of points for each display region ①', ②', ③', ④', and ⑤' of the display 10.

The percentage of controlling the interval of points for each region denoted by r is, for example, defined as follows:

Suppose that an actual distance of a road having a certain distance on the display 10 corresponds to 10 meters in any one of the regions in the road map but corresponds to 20 meters in another region. The display of the road in the latter region means that the line data may be extracted at a half (½) interval of points. However, since the display frame abcd to display the road map in the form of the bird's eye view is a rectangular shape but the actual display region ABCD on the road map is the trapezoid shape, the relationship between the compression and expansion is different according to the position within the display frame abcd of the display 10. Consequently, it is not possible to simply determine the percentage of controlling the interval of points at which the line data are extracted as described above.

Then, in the first embodiment, the percentage r of controlling the interval of points is determined according to the following equation (1) on the basis of a square root of a ratio of areas between any one of the regions and the corresponding one of the regions.

Suppose that the percentage of controlling the interval of points at which the line data are extracted at the lowest region ① is set to 1 and the respective percentages of controlling the intervals of points at which the line data are extracted are set as r2, r3, r4, and r5 for the region ②, region ③, region ④, and region ⑤, respectively.

$$\sqrt{①area/①}\ area: \sqrt{②}area/② \ area: \sqrt{④}area/④ \quad (1)$$

$$area: \sqrt{⑤}area/\sqrt{⑤}\ area = 1: r2: r3: r4: r5. \quad (1)$$

As appreciated from the equation (1), the percentages of the controlling the intervals of points at which the line data are extracted become larger as the region to the displayed on the display 10 becomes higher.

As described above, the points of the interpolations at the respective line data are extracted at the controlled interval of points according to the previously set percentage of the controlling of the interval of points. For example, in a case where the percentage of the controlling of the interval of points at which the points of the interpolations are extracted is 2, the interval of points at which the points of interpolations is one for the two subsequent points of interpolations. In addition, in a case where the percentage of the controlling of the interval of points at which the points of interpolations are extracted is 3, a first one of the three consecutive points of interpolations is extracted and the remaining two consecutive points of interpolations are not extracted and the first one of the next three consecutive points of interpolations is extracted and the next remaining two consecutive points of interpolations are extracted.

Referring back to FIG. 7, at the step S112, the CPU 4 specifies which one of the display regions of the display 10 the line data on the road and railway should be displayed and determines whether the data should be displayed on the specified region of display according to Table 7 on the basis of the specified display region of the data and the hierarchical levels.

If the data to be displayed in the display region is present (Yes) at the step S112, the routine goes to a step S114. If the data to be displayed is not present (No) at the step S112, the routine goes to a step S122 of FIG. 8.

At the step S114, the points of interpolations of the link constituting the line data are extracted according to the corresponding percentage r of controlling of the interval of points and the routine goes to a step S116.

At the step S116, the road data including the extracted points of interpolations are under the coordinate transformations into the road map data in the bird's eye view and the transformed data are stored in the V-RAM 12. The V-RAM 12 serves to temporarily store the image data to be displayed and which has been coordinate transformed.

On the other hand, in the case where the data is a data on the character(s) and on the polygon, the CPU 4, at the step S116, specifies which one of the display regions that data is to be displayed and determines whether that data should be displayed on the specified region according to Table 7 on the basis of the specified region and the hierarchical levels as described above.

If the data to be displayed in the specified region is present at the step S118 (Yes), the routine goes to a step S120. If the data to be displayed in the specified region is not present at the step S118 (No), the routine goes to the step S122.

At the step S120, the data to be displayed is under the coordinate transformation so as to be transformed into the road map data in the form of the bird's eye view and the transformed data is stored in the V-RAM 12.

Figure 10A:
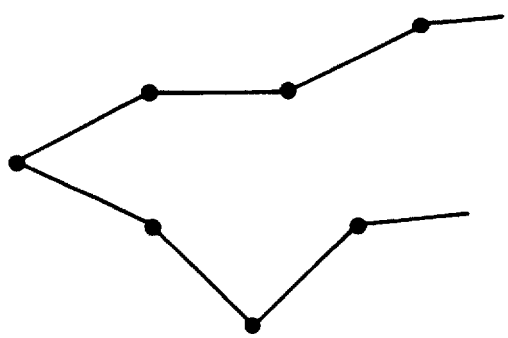
FIGS. 10A and 10B are explanatory view for explaining the thinning out (i.e., the control of an interval of points constituting a polygon data is extracted) of the polygon data provisionally executed in the first embodiment.
Figure 10B:
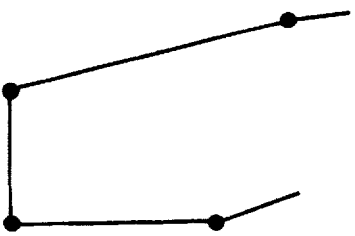

It is noted that a reason that the polygon data is not carried out under the control of the interval of points at which the polygon data is extracted is as follows with reference to FIGS. 10A and 10B:

For example, suppose that the points of interpolations of the polygon data shown in FIG. 10A are extracted one for each of two consecutive points of the interpolations. At this time, the shape of the extracted polygon data becomes that shown in FIG. 10B so that the shape is remarkably changed. Although the polygon data is a kind of the line data, the control of the interval of points at which the data are extracted is not carried out for the polygon data in order to avoid such an inconvenience as described above with reference to FIGS. 10A and 10B.

Referring back to FIG. 8, at the step S112, the CPU 4 determines whether the above-described processing has been carried out for all of the road map data stored in the RAM 13 and read from the CDROM (CD-ROM) 8.

If all of the road map data are under the above-described series of processing (Yes) at the step S122, the routine goes to a step S124.

If the unprocessed data is present (No) at the step S124, the routine returns to the step S110.

At the step S124, the CPU 4 commands the graphical controller 11 to output the road map data in the form of the bird's eye view stored in the V-RAM 12 to the display 10 and to execute the graphical drawing operation. At this time, the display 10 displays and superimposes the optimum route of travel to the destination and the mark denoting the present position of the vehicle on the road map in the form of the bird's eye view through the image screen thereof.

At the next step S126, the CPU 4 determines whether the vehicle has moved by a predetermined distance or turned through a predetermined angle or more or not.

If the vehicle has moved by the predetermined distance or turned through the predetermined angle or more (Yes) at the step S126, the routine returns to the step S104 to repeat the above-described series of processing so as to update the road map in the form of the bird's eye view.

It is noted that although, in the first embodiment, as the external memory unit having the large storage capacity, the CD-ROM (CDROM) 8 is used, any arbitrary memory unit such as a Opto-magnetic (MO) disc, a PD (Optical Phase variable disc), or magnetic tape may, alternatively, be used.

It is noted that parameters determining the bird's eye view, for example, the view point and the direction of line of sight are initialized at the step S100.

(Second Embodiment)

The hardware structure of the vehicular navigating apparatus in a second preferred embodiment is the same as that shown in FIG. 1 in the first embodiment.

The basic concept of the bird's eye view shown in FIG. 2 is applicable to that in the case of the second embodiment.

As well as in the second embodiment, the present position of the vehicle in which the second embodiment of the vehicular navigating apparatus is mounted is expressed as $F(C_X, C_Y)$ and the position of the view point E and the line of sight are determined so that the present position of the vehicle is displayed on the center of the display frame abcd of the display 10. In the second embodiment, however, the displayed region ABGH corresponding to the lowest region abgh of the display 10 is called a first area and the displayed region GHDC shown in FIG. 6 corresponding to the upper half region ghdc shown in FIG. 5 is called a second area. It is noted that the present position of the vehicle $F(C_X, C_Y)$ is placed at the center of the side GH shown in FIG. 2.

The road map data stored in the CDRON 8 is generally the same as those described in the first embodiment.

In addition, in the second embodiment, two hierarchy road map data of a first hierarchy and a second hierarchy are previously stored in the CDROM 8.

The road map data in the first hierarchy are data on the road map having the high degree of particulars. For example, the data in the first hierarchy include the road data having all of the hierachial levels of 0 through 4 from among the kinds of roads in the hierarchy formatted as shown in Table 14, the administrative districts of all hierachial levels such as Metropolitan district, prefectures, city, town, village, subprefecture, and wards (administrative districts), and the information on principal facilities of all hierachial levels. The road map data in the first hierarchy are divided and administrated into narrow regional meshes and read in the units of such narrow regional mesh units as described above. Then, the coordinate transformation of the road map data in the first hierarchy into the road map surrounding the present position of the vehicle is carried out so that they are displayed in the lower half region abgh of the display 10.

On the other hand, the road map data in the second hierarchy are the road data having a coarse (low degree of the particulars) of details. For example, the road map data in the second hierarchy includes the road data having the hierarchical levels of 3 through 4 shown in Table 14, the administrative districts of the principal hierachial levels 3 through 4 such as the Metropolitan district, the prefectures (in U. S., states), and the principal facilities in the corresponding hierachial levels. The road map data in the second hierarchy are divided and administrated into the wider regional meshes and each of the wider regional meshes is read by the CPU 4. The road map data in the second hierarchy are coordinate transformed into the road map data in the form of the bird's eye view in which the road map data in the second hierarchy are placed in the display region which is far way from the present position but which is approached to the destination. The road map data in the second hierarchy are displayed on the upper half region ghdc of the display 10 (as shown in FIG. 15).

Figure 11:
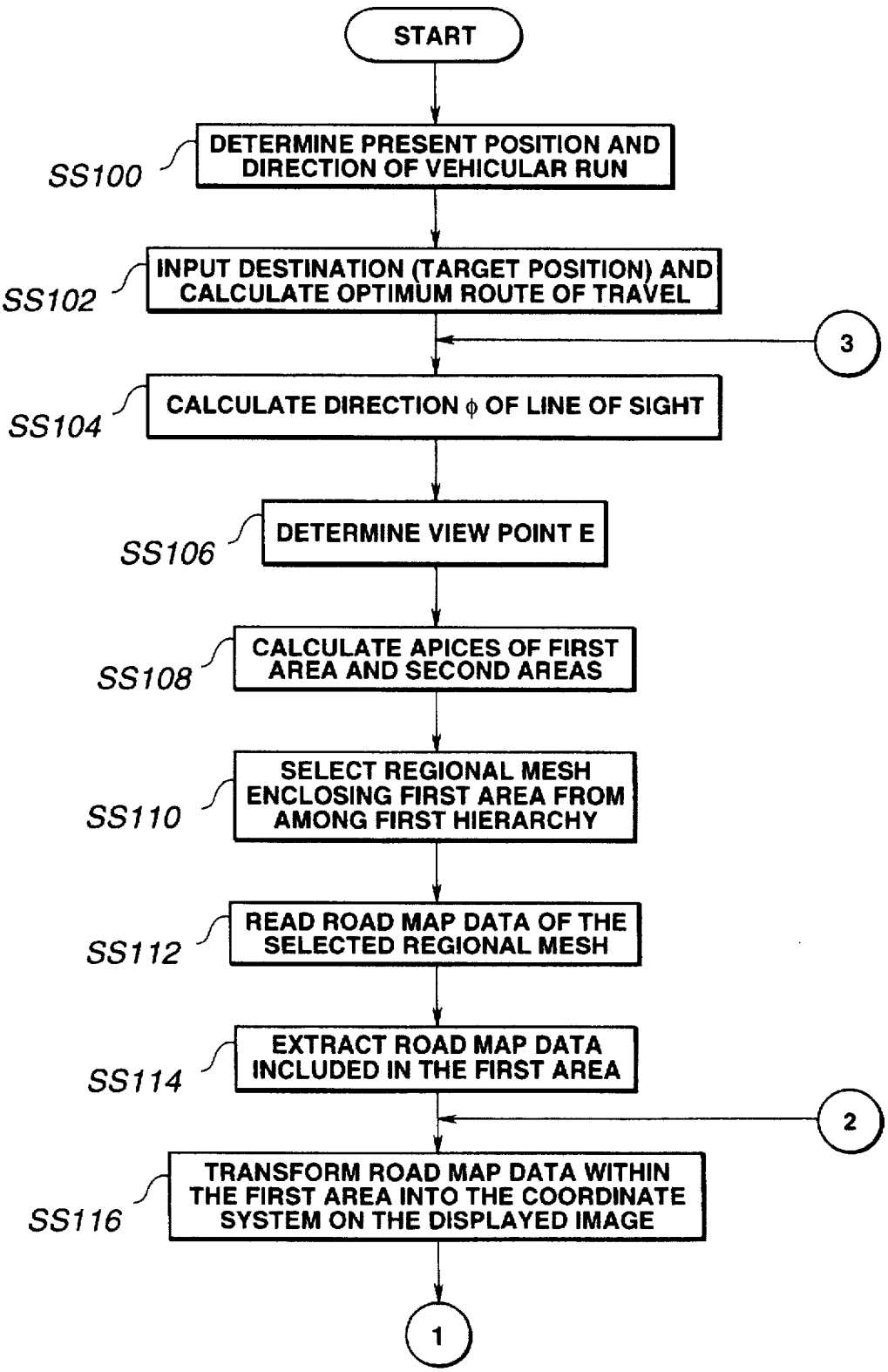
FIGS. 11 and 12 are integrally an operational flowchart of the road map display program in a case of a second preferred embodiment of the vehicular navigating apparatus according to the present invention.
Figure 12:
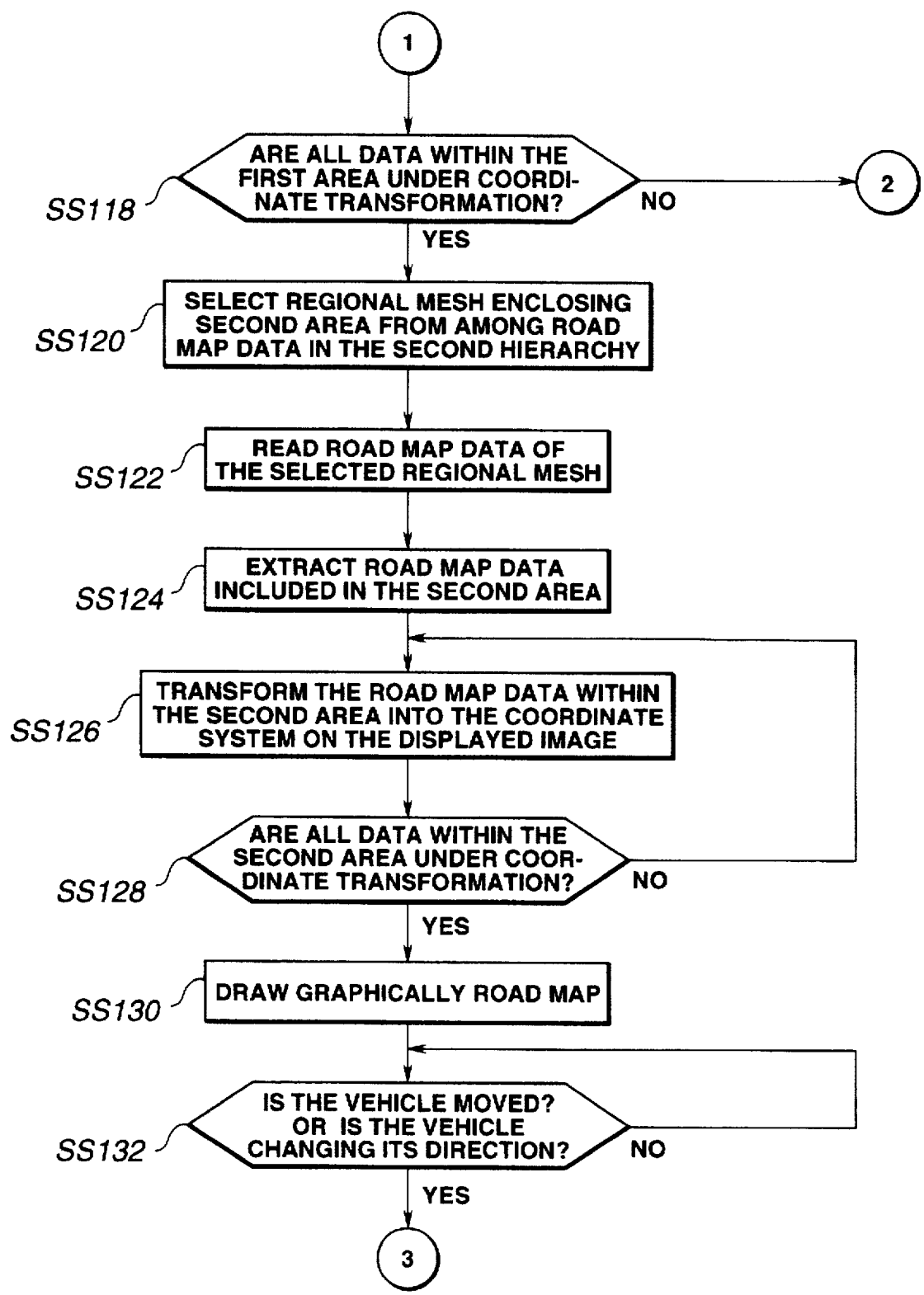

Next, FIGS. 11 and 12 integrally show the operational flowchart executed in the case of the second embodiment.

Steps SS100 through SS106 are generally the same as those of the steps S100 through S106 shown in FIG. 7.

Herein, FIG. 13 shows the two-dimensional XY plane with the Z axis of the XYZ three-dimensional coordinate system shown in FIG. 2 as the origin.

Since the present position of the vehicle denoted by F ($C_X$, $C_Y$) is already determined at the step SS100, the view point projected point E' ($V_X$, $V_Y$) on the XY plane can be derived by subtracting a vector E'F from the present position of the vehicle denoted by F ($C_X$, $C_Y$) as shown in Table 13.

It is noted that, in a case where the present position of the vehicle is displayed at any one of the positions than the center of the display frame abcd, since a height of the view point VZ and the direction of line of sight are constant, a correlation between the view point E and the display region ABCD is defined uniquely so that the view point projected point E'($V_X$, $V_Y$) can be calculated by a sight modification of the equation shown in Table 13.

Referring back to FIG. 11, at a step SS108, the CPU 4 calculates apices of the first area and the second area.

Figure 14:
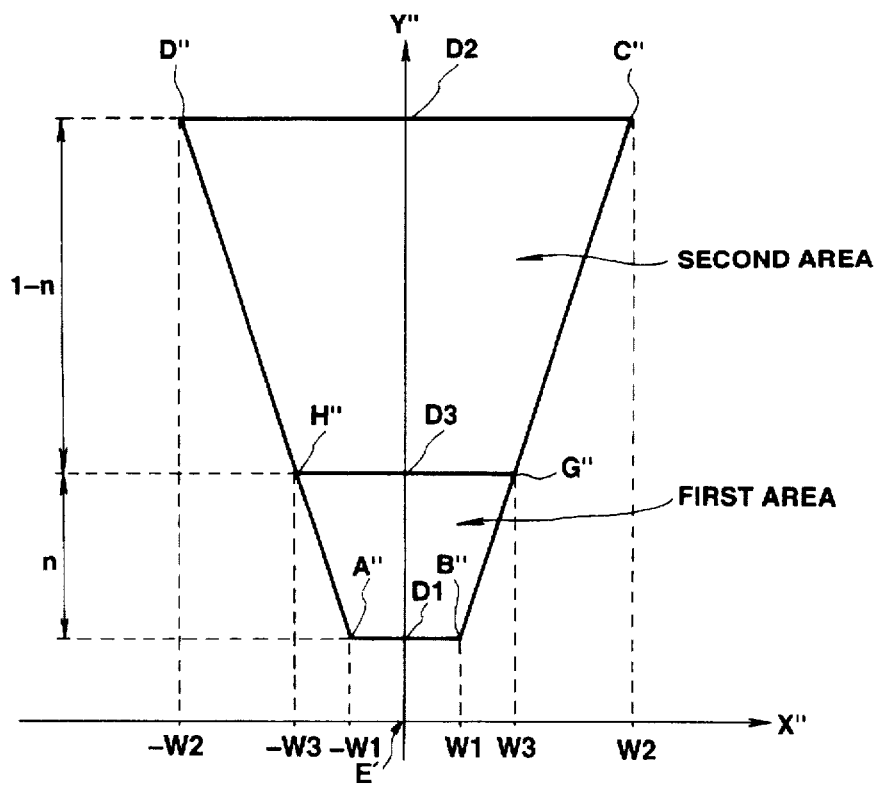
FIG. 14 is an explanatory view of an X"Y" coordinate system with the XY coordinate system shown in FIG. 13 parallel translated so that a view point provides the origin and with an X'Y' coordinate system (not shown) rotated so that a direction of a line of sight φ overlapped on a Y" axis.

FIG. 14 shows a display region A"B"C"D" in a X"Y" coordinate system such that the display region ABCD in the XY coordinate system in FIG. 15 is parallel translated so that the view point projected point E' ($V_X$, $V_Y$) provides the origin and, thereafter, the XY coordinate system is rotated so that the direction of line of sight E' F is overlapped on the Y axis ($\phi$=90 degrees). It is noted that as shown in FIG. 14, n denotes a length in the Y" axis direction of the first area when the length of the display region A"B"C"D" in the Y axis direction is set to 1 and normally 0<n<1.

In addition, as shown in FIG. 15, from an aspect ratio, a lateral width of the display frame abcd of the display 10 is set to 1 and its longitudinal width is S. Then, suppose that a distance from the view point E ($V_X$, $V_Y$, $V_Z$) up to the display frame abcd is DS and an angle through which the line of sight Ef is intersected with a straight line Eg is a half open eye (half spreading) angle α.

The apices A, B, C, D, G, and H shown in FIG. 13 corresponds to apices A", B", C", D", G", and H" shown in FIG. 14, respectively.

Each coordinate of the apices A", B", G", and H" in the first area and of the apices G", H", D", and C" in the second area are given in Table 12.

As described above, the X"Y" coordinate system is such a coordinate system that the display region ABCD in the XY coordinate system is parallel translated so that the view point projected point E' provides the origin and is rotated so that the direction of line of sight $\phi$ gives 90 degrees. In an actual practice, the direction of line of sight $\phi$ can range from 0 up to 360 degrees (0≦$\phi$<360°), it is necessary to rotate the coordinate axes through Δ$\phi$ which is a difference between the actual direction of line of sight and 90°.

FIG. 16 shows a display region A'B'C'D' in the X'Y' coordinate system such that the display region A"B"C"D" of the X"Y" coordinate system is rotated through Δ$\phi$. In FIG. 16, the apices of A", B", C", D", G", and H" corresponds to the apices A', B', C', D', G', and H' in the X'Y' coordinate system.

A rotation matrix R to rotate the coordinate axes through Δ$\phi$(=$\phi$−90 degrees) is expressed as Table 10. Hence, each coordinate of the apices A', B', G', and H' in the first area and apices G', H', D', and C' in the second area in the X'Y' coordinate system can be derived as in Table 11.

In addition, since the X'Y' coordinate system is such that the display region ABCD in the XY coordinate system shown in FIG. 13 is parallel translated so that the view point projected point E' provides the origin, each apex of A', B', C', D', G', and H' is parallel translated by $V_X$ in the X axis direction and by $V_Y$ in the Y axis direction to derive the respective apices of A, B, G, and H in the first area and of G, H, D, C, in the second area in the XY coordinate system as shown in Table 9.

As described above, since the coordinates of each apex in the first area ABGH and in the second area GHDC in the XY coordinate system, the routine goes to a step SS110 of FIG. 11.

At the step SS110, the CPU 4 selects the regional meshes including the first area ABGH from among the road map data in the first hierarchy stored in the CDROM 8. As described above, since the high degree of the particulars on the display region ABGH needs to be displayed on the lowest region abgh of the display 10, it is necessary to read the regional meshes including the first area from among the road map data in the detailed first hierarchy.

FIG. 17A shows the first area ABGH superimposed on the road map data in the first hierarchy expanded in the XY coordinate system on the basis of the X and Y coordinates of the apices A, B, G, and H. As shown in FIG. 17A, the first area ABGH is superimposed on four regional meshes of the road map in the first hierarchy. In this case, the CPU 4 selectively reads the four regional meshes.

At the next step SS112, the CPU 4 reads the selected four regional mesh road map data in the first hierarchy from the CDROM 8 and stores them into the RAM 13. It is of course that at this time if any one of the four regional mesh road maps is already read in the RAM 13, the CPU 4 reads the other remaining regional mesh road map data.

At a step SS114, the CPU 4 extracts the road map data in the first area ABGH from among the road map data in the first hierarchy of the four regional mesh stored in the RAM 13.

At a step SS116, the CPU 4 calculates the coordinate transformation of the extracted road map data in the first area into the coordinate system on the display image screen of the display 10 in the following sequence, namely, the coordinate system on the display image screen into the road map data in the form of the bird's eye view and being stored into the V-RAM 12.

FIG. 18 shows an EXEYEZ coordinate system in a case where the view point E ($V_X$, $V_Y$, $V_Z$) is the origin, and the line of sight EF is taken in -Z axis.

FIG. 19 shows SXSY display image screen coordinate system on the display frame abcd of the display 10. Coordinates ($M_X$, $M_Y$) of the arbitrary data within the first area ABGH in the VY coordinate system is transformed into the coordinates ($E_{X1}$, $E_{Y1}$, $E_{Z1}$) in the EXEYEZ coordinate system as shown in Table 8.

In Table 8, ($M_{X''}$, $M_{Y''}$) denotes the coordinates in the X"Y" coordinate system of coordinates ($M_X$, $M_Y$) of the arbitrary data in the XY coordinate system. Furthermore, the coordinates ($E_{X1}$, $E_{Y1}$, $E_{Z1}$) of the EXEYEZ coordinate system are transformed into the coordinates ($S_{X1}$, $S_{Y1}$) in the SXSY display image screen coordinate system as follows:

$$S_{X1} = -DS \cdot E_{X1}/E_{Z1}, \text{ and}$$

$$S_{Y1} = -DS \cdot E_{Y1}/E_{Z1}.$$

Referring to FIG. 12, the CPU determines whether all of the data within the first area ABGH have been coordinate transformed into the road map data in the bird's eye view. If there remains the unprocessed data (No) at the step SS118, the routines returns to the step SS116 to repeat the above described series of processing.

If the coordinate transformation on all of the data within the first area are ended (Yes) at the step SS118, the routine goes to a step SS120.

At steps SS120 through SS128, the same series of processing is carried out for the second area GHDC in the same way in the case of the first area ABGH.

At the step SS120, the CPU 4 selects the regional meshes covering the second area GHDC from among the road map data in the second hierarchy stored in the CDROM (CD-ROM) 8 on the basis of the X, Y coordinates of each apex of the second area GHDC.

As described above, since it is necessary to display a general road map (low degree of particulars) of the display region GHDC on the upper half region ghdc of the display 10, it is necessary to read the road maps of the regional meshes enclosing the second area GHDC from among the road map data in the second hierarchy.

FIG. 17B shows the second area GHDC superimposed on the road map in the second hierarchy expanded in the XY coordinate system on the basis of the X, Y coordinates of the apices of G, H, D, and C.

The regional meshes of the road map data in the second hierarchy becomes wider than those of the road map data in the first hierarchy. The second area GHDC covers four regional meshes road maps in the second hierarchy and these four regional meshes are read and selected as the selected regional meshes.

At the subsequent step SS122, the CPU 4 reads the selected road map data of the second hierarchy in the four regional meshes and stored in the RAM 13.

It is noted that at this time, if any one or more of the road maps in the four regional meshes are already stored in the RAM 13, the road map data on the remaining regional meshes are read.

At the step SS124, the CPU 4 extracts the road map data included in the second area GHDC from among the second hierachial data of the four regional meshes stored in the RAM 13.

At the step SS126, the road map data within the extracted second area are coordinate transformed into the SXSY coordinate system of the display image screen of the display 10, i.e., into the road map data in the form of the bird's eye view and are stored in the V-RAM 12.

At the step SS128, the CPU 4 determines whether all of the data within the second area GHDC are coordinate transformed into the data of road maps in the form of the bird's eye view. If there are unprocessed data (No) at the step SS128, the routine returns to the step SS126 to repeat the above-described series of processing.

If the coordinate transformations for all of the data are ended (Yes) at the step SS128, the routine goes to a step SS130.

At the step SS130, the CPU 4 transfers the road map data in the form of the bird's eye view of the first area ABGH and the second area GHDC to the display 10 via the graphic controller 11 and are graphically drawn thereon. At this time, the optimum route of travel to the destination and the mark representing the present position of the vehicle are superimposed on the road map in the form of the bird's eye view.

At the subsequent step SS132, the CPU 4 determines whether the vehicle has run by the predetermined distance of travel or has turned through the predetermined angle or more. If the CPU 4 determines that the vehicle has run by the predetermined distance of travel or the vehicle has turned through the predetermined angle or more (Yes) at the step SS132, the routine returns to the step SS104 to repeat the above-described series of processing so that the whole road map in the form of the bird's eye view is updated.

It is noted that the number of regional meshes on the road map data to be read from the CR-ROM (CDROM) 8 are prescribed according to a maximum length from among the lengths between the respective apices in the display region ABGH and display region GHDC.

For example, for the display 10 having the normal display frame abcd, the number of regional meshes to be read from the road map data in the first hierarchy are determined according to the length L1 between the apex A and the apex G (or length between the apex B and the apex H) as shown in FIG. 20A for the display region ABGH. The number of regional meshes to be read are determined from the road map data in the second hierarchy according to the length L2 between the apices HC (or a length between the apex G and apex D) for the display region GHDC.

In addition, for the display 10 having a relatively low S (longitudinal width), i.e., wide display frame abcd, a length L1 between the apex G and apex H for the display region ABGH shown in FIG. 15 can determine the number of the regional meshes to be read from the road map data in the first hierarchy, as shown in FIG. 20B.

The number of the regional meshes to be read (selected) from the road map data in the second hierarchy are determined according to a length L2 between the apex C and apex D for the display region GHDC. In other words, when a maximum length L between the respective two apices as shown in FIG. 21 is L≦Lm·m (Lm denotes a length of a shorter side in each of the regional meshes and m denotes a minimum integer value on the regional meshes which satisfies L≦Lm·m and, for example, in the case of FIG. 21, m=1), the CPU 4 needs to read (select) the road map data in the units of the $(m+1)^2$ number of the regional meshes. In details, in the case of the example of FIG. 21, since L<Lm, the minimum value of m which satisfies L≦Lm·m is 1. Therefore, at this time, the number of the regional meshes to be selected by the CPU 4 is four. In the case of the example where L<Lm, the minimum number of m which satisfies L≦Lm·m, It is nine. It is necessary to secure the memory capacity which is capable of at least storing the road map data of the regional meshes having the number of $(m+1)^2$ for the RAM 13 which temporarily stores the read road map data. On the contrary, the memory capacity of temporarily storing the read data read from the memory unit having the large memory areas and which stores the whole road map data needs to have a capacity which is capable of at least storing the road map data corresponding to the $(m+1)^2$ number of the regional meshes with the larger number of data per mesh within the road map data having the first hierarchy and the road map data having the second hierarchy. An economical design, consequently, becomes possible.

Although, in the second embodiment, with the road map data having the two hierarchies which are different in the degrees of particulars previously stored, the road map data having the hierarchies corresponding to the respective display regions of the display 10 are read, the hierarchies in the road map data stored in the memory unit may be three or more. In this case, the road map in the form of the bird's eye view is graphically drawn on the lowest region of the display 10 on the basis of the road map data having the highest degree of the particulars and as the display region becomes upper, the road map in the form of the bird's eye view having the lower degree of the particulars may be graphically drawn thereon.

That is to say, as the kinds of the road maps having the different degrees of the particulars are more (increased), the degree of the particulars becomes lower in the stepwise manner as the region of the road map in the form of the bird's eye view to be displayed on the image screen of the display 10 becomes upper, i.e. as the display region goes from that surrounding the present position to that surrounding the destination. Consequently, the road map on the whole display region on the image screen can be viewed approximately three dimensionally with the feeling of depth given to the viewer.

(Third Embodiment)

FIG. 22 shows an operational flowchart executed by a third preferred embodiment of the vehicular navigating apparatus according to the present invention.

The basic concept of the bird's eye view in the case of the third embodiment and the basic hardware structure of the third embodiment are the same as those in the case of the first or second embodiment (refer to FIGS. 1, 2, and 13).

Steps SSS100 through SSS106 are generally the same as those steps SS100 through SS106 shown in FIG. 11.

At a step SSS108, the position of the view point E and the line of sight EF are determined so that the present position of the vehicle F ($C_X$, $C_Y$) is displayed on the center of the display frame abcd of the display. In the third embodiment, the Z axis coordinate VZ (hereinafter, referred to as a height of the view point) of the view point E and the looking down angle θ are predetermined values previously set.

Each apex of the display region ABCD is calculated at a step SSS110.

FIG. 13 used in the explanation of the second embodiment shows the XY plane when Z=0 in the three dimensional coordinate system shown in FIG. 2.

The projected point E' ($V_X$, $V_Y$) of the view point E ($V_X$, $V_Y$, $V_Z$) on the XY plane is calculated as expressed in the Table 13.

It is noted that in the case where the present position of the vehicle is displayed at a position other than the center point of the display frame abcd, the correlation between the view point E and the display region ABCD is uniformly defined since the height of the view point $V_Z$ and the direction of line of sight are constant so that the slight modification in the equation of Table 13 permits the calculation of the projected point E'. For example, in a case where the present position of the vehicle is displayed at a lower position below a point of intersection (f) at which the left-right center line (gh) and upward-downward (vertical line are intersected (refer to FIG. 15), the looking down angle of θ may be selected so that an item of ($V_Z$/tanθ) in the equation of Table 13 becomes small.

The XY coordinate system of FIG. 13 is parallel translated so that the view point projected point E'($V_X$, $V_Y$) gives the origin so as to set the X'Y' coordinate system shown in FIG. 23.

Furthermore, the X'Y' coordinate system is rotated so that the direction of line of sight φ is superposed on the Y" axis so as to set the X"Y" coordinate system.

It is noted that, as shown in FIG. 15 used in the case of the second embodiment, the lateral axis is 1 of the display frame abcd of the display 10 and longitudinal axis is S, the distance from the view point E ($V_X$, $V_Y$, $V_Z$) to the display frame abcd is DS, the angle through which the line of sight Ef is intersected with the straight line Eg is referred to as the half open (spreading) angle α described above.

The display region ABCD in the XY coordinate system shown in FIG. 13 corresponds to the display region A"B"C"D" of the X"Y" coordinate system of FIG. 23.

The coordinates of each apex of the display region A"B"C"D" in the new coordinate system X"Y" coordinate system are given as in the Table 12 except G", H", and D3.

Next, the coordinates of each apex of the display region A'B'C'D' in the X'Y' coordinate system with the direction of line of sight φ taken into consideration are determined. Since the X'Y' coordinate system is the rotation of the X"Y" coordinate system, the coordinates of each apex of the display region A"B"C"D" calculated in the Table 12 are transformed by means of a rotation of the coordinate axes as described below:

$$A' = R \times A",$$

$$B' = R \times B",$$

$$C' = R \times C",$$

$$D' = R \times C",$$

wherein $$R = \begin{pmatrix} \sin\phi & \cos\phi \\ -\cos\phi & \sin\phi \end{pmatrix}$$

Furthermore, each apex of the display region ABCD in the XY coordinate system is calculated on the basis of the coordinates of each apex of the display region A'B'C'D' in the X'Y' coordinate system. Since the XY coordinate system is the parallel translation of the X'Y' coordinate system, the coordinate transformation is carried out with the coordinates of each apex of the display region A'B'C'D' calculated in the Table 12 parallel translated by $V_X$ in the X axis direction and by $V_Y$ in the Y axis direction as follows:

$$A = A' + P,$$

$$B = B' + P,$$

$$C = C' + P,$$

$$D = D' + P,$$

wherein $$P = \begin{pmatrix} V_X \\ V_Y \end{pmatrix}$$

A step SSS112 shown in FIG. 22, the CPU 4 reads the road map data having a range (required regional meshes) including the display region ABCD from among the road map data stored in the CD-ROM (CDROM) 8 into the RAM 13 as does in the case of the second embodiment.

It is noted that the content of the memory unit, i.e., the CD-ROM 8 is generally the same as those in the case of the first embodiment.

Next, at a step SSS114, the CPU 4 executes a graphical drawing routine for lines of geographical longitudes and latitudes as will be described later so that the lines of longitudes and latitudes are drawn on the image screen of the display 10.

At the subsequent step SSS116, the CPU 4 carries out the coordinate transformation for the road map data in the XY plane (two-dimensional plane) read from the CD-ROM 8 into the road map data in the form of the bird's eye view to be displayed on the image screen of the display 10. The detailed explanation of this coordinate transformation will be made later.

At a step SSS118, the road map data in the bird's eye view is transferred to the V-RAM 12 and is graphically drawn on the display 10 via the graphic controller 11, the car mark representing the present position of the vehicle and the optimum route of travel are superimposed on the road map in the form of the bird's eye view in display.

At a step SSS120, the CPU 4 superimposes and graphically draws the character information on the road map in the form of the bird's eye view during the display. It is noted that although the road map is coordinate transformed into that in the form of the bird's eye view, the character information is not transformed into the bird's eye view.

At a step SSS122, the CPU 4 determines whether the vehicle has moved by the predetermined distance or the vehicle has turned through the predetermined angle or more. If the vehicle has moved by the predetermined distance or turned through the predetermined angle or more, the routine returns to the step SSS106 to repeat the above series of processing and to update the road map in the form of the bird's eye view.

Next, the detailed explanation of the coordinate transformation of the road map data in the two-dimensional plane of the XY coordinate system into the road map data in the form of the bird's eye view which is displayed on the image screen of the display 10 will be made.

FIG. 24 shows a relationship between the EXEYEZ coordinate system with the view point E ($V_X$, $V_Y$, $V_Z$) as the origin and the line of sight EF superposed on -Z axis, the SXSY display coordinate system with a center of the display frame abcd of the display 10 as the origin, and the display region ABCD.

Suppose that coordinates of an arbitrary road map data PP in the XY coordinate system are ($M_X$, $M_Y$).

As shown in FIG. 23, with the XY coordinate system parallel translated to set the X'Y' coordinate system with the view point projected point E' ($V_X$, $V_Y$) given as the origin, the coordinates ($M_{X'}$, $M_{Y'}$) of the arbitrary road map data PP in the X'Y' coordinate system which is set such that the XY coordinate system is rotated so that the line of sight (E'F) is overlapped on the Y" axis is expressed as a lower portion (lower equation) of the Table 8.

The coordinates ($M_{X''}$, $M_{Y''}$) of the data PP in the X"Y" coordinate system are coordinate transformed into the coordinates ($E_{X1}$, $E_{Y1}$, $E_{Z1}$) in the EXEYEZ coordinate system as in an upper portion (upper equation) of the Table 8.

Table 15 shows the coordinates ($E_{X1}$, $E_{Y1}$, $E_{Z1}$) in the EXEYEZ coordinate system derived by substituting the lower position of the Table 8 into the upper portion of the Table 8 and modifying the established equation of the Table 8.

Furthermore, the coordinates ($E_{X1}$, $E_{Y1}$, $E_{Z1}$) of the data PP in the EXEYEZ coordinate system are transformed into the coordinates ($S_{X1}$, $S_{Y1}$) in the SXSY display coordinate system in the following equation:

$S_{X1} = -DS \cdot E_{X1}/E_{Z1}$, $S_{Y1} = -DS \cdot E_{Y1}/E_{Z1}$.

Next, FIGS. 25 and 26 show integrally a subroutine of graphical drawings on the lines of geographical longitudes and parallels of latitudes executed at the step SSS114 shown in FIG. 22.

Suppose that, at the previous step SSS112 of FIG. 22, the CPU 4 reads the road map data in the range including the regional meshes M1 through M4 covering the display region ABCD, as shown in FIG. 27.

In FIG. 27, the coordinates in the XY coordinate system are expressed as x, y, those of the apices A, B, C, and D of the display region are expressed as ($x_a$, $y_a$), ($x_b$, $y_b$), ($x_c$, $y_c$), and ($x_d$, $y_d$), respectively.

In addition, suppose a rectangular shape JKPQ enclosing the display region ABCD and enclosed by straight lines in parallel to the X axis and Y axis. The rectangular shape JKPQ is a region to be transformed from the XY coordinate system into the SXSY display screen coordinate system.

The following maximum values and minimum values in the x coordinate and y coordinate in the rectangular shape JKPQ are defined as follows:

$x_{min} = \min(x_a, x_b, x_c, x_d)$, $y_{max} = \max(x_a, v_b, x_c, x_d)$, $y_{min} = \min(y_a, y_b, y_c, y_d)$, $y_{max} = \max(y_a, y_b, y_c, y_d)$.

At this time, the coordinates of the apices J, K, P, and q of the region to be transformed (JKPQ) are as follows:

($x_{min}$, $y_{min}$) (=J), ($x_{max}$, $y_{min}$) (=K), ($x_{max}$, $y_{max}$) (=P), and ($x_{min}$, $y_{max}$) (=Q).

In addition, as shown in FIG. 27, the coordinates of an apex of one (M3) of the four regional meshes (M1 through M4) located at a left lower corner with respect to the view point projected point E' is ($x_s$, $y_s$).

FIG. 28 shows an expanded view of the rectangular shaped region to be coordinate transformed JKPQ.

Referring back to FIG. 25, at a step S200, the CPU 4 initializes the coordinate x to $x_s$.

At a step S202, the CPU 4 determines whether the coordinate x is equal to or above the X axis coordinate value of $x_{min}$ in the line of JQ or not.

If $x \geq x_{min}$ at the step S202 (Yes), the routine goes to a step S206. If $x < x_{min}$ at the step S202 (No), the routine goes to a step S204 in which the coordinate x is added to K1 (predetermined value) (x←x +k1) and the routine returns to the step S200.

If $x \geq x_{min}$, namely, if the coordinate x falls within the region JKPQ to be transformed (Yes) at the step S202, the routine goes to the step S206 in which the CPU 4 calculates points of intersections (cross points) Ri ($x_i$, $y_{min}$), Ti ($x_i$, $y_{max}$) (i=1, 2, ---) between the sides JK and QP of the region to be transformed and the line of the longitudes prescribed as X=x.

At a step S208, the CPU 4 transforms the points of intersections Ri, Ti into the points Ri', Ti' in the SXSY display screen coordinate system in the procedure described above.

At a step S210, the CPU 4 graphically draws a straight line connecting both of the points Ri' and Ti', i.e., the line of the longitudes. The lines of longitudes Ri' and Ti' correspond to the lines of longitudes Ri Ti in the XY coordinate system in the XY plane. At a step S212, the predetermined value K1 is added to the coordinate x and the routine goes to a step S214. At a step S214, the CPU 4 determines whether the coordinate x exceeds the X axis coordinate $x_{max}$ of the line KP. If $x > x_{max}$ at the step S214 (yes), the routine goes to a step S220. If $x \leq x_{max}$, the routine returns to the step S206.

Consequently, the lines of geographical longitudes, each line having an interval of distance corresponding to the predetermined value K1, are graphically drawn. The predetermined value K1 is, for example, 200 meters.

Next, the lines (parallels) of geographical latitudes are graphically drawn as shown in FIG. 26.

At the step S220, the coordinate y is initialized to ys. At the subsequent step S222, the CPU 4 determines whether the coordinate y is equal to or above y axis coordinate $y_{min}$ of the side JK. If $y \geq y_{min}$ (Yes), the routine goes to a step S226.

If $y<y_{min}$ at the step S222 (No), the routine goes to a step S224 in which y=y+K2 (y←y+K2) (K2 denotes another predetermined value).

If $y \geq y_{min}$ at the step S222 (yes), namely, the coordinate y falls in the region JKPQ to be transformed, the routine goes to a step S226, in which the points of intersections Vi, Wi are calculated.

In details, if $y \geq y_{min}$, i.e., if the coordinate y falls within the region JKPQ to be transformed, the CPU 4 calculates points of intersections Vi ($y_i$, $x_{min}$), Wi ($y_i$, $x_{max}$) (i=1, 2, ---) between sides JQ and KP of the region to be transformed JKPQ and each line of geographical latitudes prescribed as Y=y.

At a step S228, the CPU 4 transforms the points of intersections Vi, Wi into the points Vi', Wi' in the SXSY display screen coordinate system in the above described procedure. At a step S230, the CPU 4 graphically draws the straight lines connecting the points Vi' and Wi', namely, the lines of geographical latitudes. The lines of geographical latitudes Vi' Wi' corresponds to the lines of latitudes Vi Wi in the XY plane road map coordinate system.

At a step S232, the predetermined value of K2 is added to the y coordinate (y←y+K2) and the routine goes to a step S234.

At the step S234, the CPU 4 determines whether the coordinate y exceeds the Y axis coordinate $y_{max}$ in the line PQ. If $y>y_{max}$ at the step S234 (Yes), the present subroutine is ended. If $y \leq y_{max}$ at the step S234, the routine returns to the step S226.

Thus, the lines (parallels) of latitudes, each line of the latitude having an interval of distance from the adjacent one of the other lines of the latitudes of the predetermined value K2. The numerical value of K2 is, for example, 200 meters (same as the predetermined value of K1).

FIG. 29 shows a display example in which the lines of longitudes and latitudes, the present position of the vehicle, and the route of travel to the destination are graphically drawn on the two-dimensional road map. In the example shown in FIG. 29, the equal intervals of the distances between the mutually adjacent lines of the longitudes and latitudes are graphically drawn as denoted by dotted lines.

FIG. 30 shows a display example in which the lines of geographical longitudes and latitudes, the lines of geographical longitudes and latitudes, the present position of the vehicle, and the route of travel are graphically drawn on the display screen of the display in the form of the bird's eye view using the navigating apparatus in the third embodiment as in the same situation as shown in FIG. 29.

It is noted that although, in both of FIGS. 29 and 30, the vehicular forwarding direction is not directed toward the upper center direction of the image screen, this is because the direction of line of sight φ is defined such that a point of location ahead of the present position of the vehicle by a predetermined distance along the optimum route of travel is placed at the upper region of the display image screen.

FIGS. 31 and 32 shows other display examples in which the vehicle placed at the position shown in FIGS. 29 and 30 has run on the optimum route of travel and the vehicle has just turned right to a point of traffic intersection. Since, in FIG. 32, the direction of line of sight φ is changed along with the movement of the vehicle and/or the turning of the vehicle, it will be appreciated that the direction of the vehicle φ with respect to the lines of longitudes and latitudes is varied from a state shown in FIG. 30. The rotation of the road map in the form of the bird's eye view can be grasped intuitively according to a variation in the gradients of the lines of longitudes and latitudes.

As described above, since, in the third embodiment, the lines of the geographical longitudes and latitudes are superimposed and displayed on the road map in the form of the bird's eye view and these are updated whenever the vehicle has moved by the predetermined distance and has turned through the predetermined angle or more, the feelings of perspectives and distance in the road map of the bird's eye view can be improved. The direction of the road map can easily be grasped so that the forwarding direction of the vehicle can also be grasped.

Especially, when the vehicle has changed its forwarding direction by its turn right or turn left, the variation in the forwarding direction is not clearly recognized if the lines of longitudes and latitudes are not present. However, in the third embodiment, the lines of longitudes and latitudes are rotated at times before or after the vehicle has passed through the points of the traffic intersections so that the degree of the turning of the vehicle can clearly be recognized even if the change in the forwarding direction on the image screen is slight.

(Modification of the third embodiment)

FIGS. 33 and 34 show display examples of a modification of the third embodiment in which the lines of the longitudes are emphasized as compared with the lines of latitudes on the road maps shown in FIGS. 29 and 30 (the lines of longitudes are denoted by solid lines and those of the latitudes are denoted by the dotted lines).

FIGS. 35 and 36 show other display examples of the modification of the third embodiment in which the lines of longitudes are emphasized as compared with the lines of latitudes on the road maps shown in FIGS. 31 and 32 (the lines of longitudes are denoted by the solid lines and those of the latitudes are denoted by the dotted lines).

Methods of the emphasizing of the lines of the longitudes with respect to the lines of latitudes include thickness in each line of the longitudes bolder than that of the latitudes; different colored lines of the longitudes and of the latitudes; light or shade; and solid lines and the dotted lines (shown in FIGS. 31 through 34).

In the graphical draw processing in the modification of the third embodiment, kinds of the lines of longitudes to be emphasized may be changed to graphically draw the lines of longitudes at the steps S210 of FIG. 25 and S230 of FIG. 26.

In this way, since the lines of longitudes are more emphasized than those of the latitudes, the direction of North and South in the road map in the form of the bird's eye view can easily be grasped, thus the direction of the forwarding direction with respect to the North can easily be grasped. Especially, in a case where the vehicular forwarding direction is changed by the turn right or left at the point of any intersection, the gradient of the lines of longitudes is changed according to the degrees of the turnings of the vehicle, the turning of the vehicle can be quantitatively recognized even if the variation in the forwarding direction is slight.

(Other Modifications of the third embodiment)

Although, in the modification and the third embodiment described above, both of the road map on the two-dimensional plane and the lines of the longitudes and latitudes are graphically drawn on the road map in the form of the bird's eye view along with the movement of the vehicle, another modification in which only the road map on the two-dimensional plane is coordinate transformed into the road map in the form of the bird's eye view and, thereafter, the lines of longitudes and latitudes previously set in the form of the bird's eye view are graphically drawn on the road map in the form of the bird's eye view.

FIG. 37 shows an example of the lines of longitudes and latitudes in the case where the upper position of the road map on the two-dimensional plane is directed to the North.

FIG. 38 shows an example of the bird's eye view of the lines of longitudes and latitudes shown in FIG. 37 in a case where the true North direction is viewed from the predetermined view point E along the predetermined line of sight EF with the direction of line of sight φ as 90 degrees.

This lines of the longitudes and latitudes coordinated transformed so as to be displayed in the form of the bird's eye view are stored in the RAM 13.

FIG. 39 shows an example of the display in which the lines of the longitudes and latitudes and the present position of the vehicle are graphically drawn on the road map on the two-dimensional plane. In the case of FIG. 39, the road map is displayed with the upper position being directed to the true North. The lines of longitudes are graphically drawn in the upper and lower (vertical direction) directions of the road map and the lines of latitudes are graphically drawn on the road map in the left and right-handed (lateral) directions.

FIG. 40 shows another example of the display in which the lines of longitudes and latitudes are graphically drawn on the road map already coordinate transformed in the form of the bird's eye view. The true North direction is viewed from the predetermined view point E along the predetermined line of sight EF with the direction of the line of sight φ as 90 degrees.

That is to say, FIG. 40 shows the display example in which the lines of the longitudes and latitudes previously stored are graphically drawn under a predetermined condition on the road map which is the coordinate transformation of the road map on the two dimensional plane in a case where the true North is viewed from the view point E along the predetermined line of sight EF with the direction of line of sight φ as 90 degrees.

In the graphical draw processing in the modification of the third embodiment shown in FIG. 40, the lines of the longitudes and latitudes are graphically drawn under the predetermined condition and previously stored without the graphical draw of the lines of longitudes and latitudes after the coordinate transformations of these lines into the bird's eye view forms whenever the vehicle has moved or turned at the step SSS114 of FIG. 21. Thus, the lines of longitudes and latitudes do not rotate according to the movement of the vehicle or the turning of the vehicle.

Therefore, since the lines of the longitudes and latitudes in the form of the bird's eye view previously stored and under the predetermined condition are graphically drawn on the road map in the form of the bird's eye view, a processing time such that the lines of longitudes and latitudes are coordinate transformed into the bird's eye view forms whenever the vehicle has moved or turned becomes unnecessary. Consequently, the feelings of the depth and the distance in the road map of the bird's eye view can be improved.

It is noted that as described in the former modification of the third embodiment, the lines of longitudes may be emphasized with respect to the lines of latitudes, or alternatively, both of the lines of longitudes and latitudes may graphically drawn in the different display methods (different colored lines, light and shade, and solid lines and dotted lines).

Although, in the modifications and third embodiment, the lines of the longitudes and latitudes on the two-dimensional plane are coordinate transformed into the road map in the form of the bird's eye view, line segments in the form of a grid mutually perpendicular to one another on the two-dimensional plane may be coordinate transformed into the bird's eye view and may be drawn graphically on the road map in the form of the bird's eye view.

The lines of the longitudes and latitudes may merely be displayed by the different display methods described above.

It is noted that a combination of any two or three of the first, second, or third embodiment may be established in the case of the mobile body (vehicular) navigating apparatus according to the present invention.

It is finally noted that the display 10 shown in FIG. 1 may comprise a full color liquid crystal display device or may comprise a cathode ray tube.

TABLE 1

| START POINT | END POINT | INTERPOLATION POINTS | | | HIERARCHICAL LEVEL |
|---|---|---|---|---|---|
| | | (1) | (2) | (3) | |
| X Y | X Y | X Y | X Y | X Y | ... |
| LINK 1 | | | | | 1 |
| LINK 2 | | | | | 2 |
| LINK 3 | | | | | 4 |

TABLE 2

| CLASSIFIED KINDS OF ROADS | HIERARCHICAL LEVEL |
|---|---|
| FREEWAY, HIGHWAY (CHARGE HIGHWAY) | 1 |
| GENERAL NATIONAL HIGHWAY | 2 |
| PRINCIPAL REGIONAL ROADS | 3 |
| GENERAL ROADS EQUAL TO OR WIDER THAN 5.5 M IN WIDTH | 4 |
| GENERAL ROADS NARROWER THAN 5.5 M IN WIDTH | 5 |

TABLE 3

| NAMES OF ADMINISTRATIVE DISTRICT | HIERARCHICAL LEVEL |
|---|---|
| SPHERE CIRCLE | 1 |
| PREFECTURE | 2 |
| CITY, SUBPREFECTURE | 3 |
| TOWN, WARD | 4 |
| VILLAGE | 5 |

TABLE 4

| NAMES OF ADMINISTRATIVE DISTRICT | X | Y | HIERARCHICAL LEVEL |
|---|---|---|---|
| KANAGAWA | | | 2 |
| ATSUGI | | | 3 |
| OKAZU FURUHISA | | | 5 |

TABLE 5

| POLYGON | HIERARCHICAL LEVEL |
|---|---|
| SPHERE CIRCLE LEVEL | 1 |
| PREFECTURE LEVEL | 2 |
| CITY LEVEL | 3 |
| TOWN LEVEL | 4 |
| VILLAGE LEVEL | 5 |

TABLE 6

| NAME OF POLYGON | (1) X | (1) Y | (2) X | (2) Y | (3) X | (3) Y | (4) X | (4) Y | ... | HIERARCHICAL LEVEL |
|---|---|---|---|---|---|---|---|---|---|---|
| KAWA-GUCHI LAKE | | | | | | | | | | 3 |
| ATSUGI KOKUSAI CC | | | | | | | | | | 5 |
| HAKUSAN SHINRIN PARK | | | | | | | | | | 4 |
| . | | | | | | | | | | |
| . | | | | | | | | | | |

TABLE 7

| DISPLAY REGIONS | HIERARCHICAL LEVEL |
|---|---|
| ①' | 1–5 |
| ②' | 1–4 |
| ③' | 1–3 |
| ④' | 1–2 |
| ⑤' | 1 |

TABLE 8

$$\begin{pmatrix} EX1 \\ EY1 \\ EZ1 \end{pmatrix} = \begin{pmatrix} 1 & 0 & 0 \\ 0 & \sin\theta & \cos\theta \\ 0 & -\cos\theta & \sin\theta \end{pmatrix} \begin{pmatrix} MX'' \\ MY'' \\ -VZ \end{pmatrix}$$

$$\begin{pmatrix} MX'' \\ MY'' \end{pmatrix} = \begin{pmatrix} \sin\theta & -\cos\theta \\ \cos\theta & \sin\theta \end{pmatrix} \begin{pmatrix} MX - VX \\ MY - VY \end{pmatrix}$$

TABLE 9

$A = A' + P,$
$B = B' + P,$
$C = C' + P,$
$D = D' + P,$
$G = G' + P,$
$H = H' + P$
WHEREIN $$P = \begin{pmatrix} VX \\ VY \end{pmatrix}$$

TABLE 10

$$R = \begin{pmatrix} \cos\Delta\phi & -\sin\Delta\phi \\ \sin\Delta\phi & \cos\Delta\phi \end{pmatrix}$$

TABLE 11

$$A' = R \cdot A'' = \begin{pmatrix} \cos\Delta\phi & -\sin\Delta\phi \\ \sin\Delta\phi & \cos\Delta\phi \end{pmatrix} \begin{pmatrix} -W1 \\ D1 \end{pmatrix},$$

$$B' = R \cdot B'' = \begin{pmatrix} \cos\Delta\phi & -\sin\Delta\phi \\ \sin\Delta\phi & \cos\Delta\phi \end{pmatrix} \begin{pmatrix} W1 \\ D1 \end{pmatrix},$$

$$C' = R \cdot C'' = \begin{pmatrix} \cos\Delta\phi & -\sin\Delta\phi \\ \sin\Delta\phi & \cos\Delta\phi \end{pmatrix} \begin{pmatrix} W2 \\ D2 \end{pmatrix},$$

$$D' = R \cdot D'' = \begin{pmatrix} \cos\Delta\phi & -\sin\Delta\phi \\ \sin\Delta\phi & \cos\Delta\phi \end{pmatrix} \begin{pmatrix} -W2 \\ D2 \end{pmatrix},$$

$$G' = R \cdot G'' = \begin{pmatrix} \cos\Delta\phi & -\sin\Delta\phi \\ \sin\Delta\phi & \cos\Delta\phi \end{pmatrix} \begin{pmatrix} W3 \\ D3 \end{pmatrix},$$

$$H' = R \cdot H'' = \begin{pmatrix} \cos\Delta\phi & -\sin\Delta\phi \\ \sin\Delta\phi & \cos\Delta\phi \end{pmatrix} \begin{pmatrix} -W3 \\ D3 \end{pmatrix}$$

TABLE 12

$A'' = (-W1, D1),$
$B'' = ( W1, D1),$
$C'' = ( W2, D2),$
$D'' = (-W2, D2),$
$G'' = ( W3, D3),$
$H'' = (-W3, D3),$
WHEREIN $$W1 = \frac{VZ \cdot \tan\alpha \sqrt{1 + \tan^2\theta}}{\tan\theta + S \cdot \tan\alpha},$$

$$W2 = \frac{VZ \cdot \tan\alpha \sqrt{1 + \tan^2\theta}}{\tan\theta - S \cdot \tan\alpha},$$

$W3 = W1 + (W2 - W1) \cdot n,$ $$D1 = \frac{VZ \cdot (1 - S \cdot \tan\alpha \cdot \tan\theta)}{\tan\theta + S \cdot \tan\alpha},$$

$$D2 = \frac{VZ \cdot (1 + S \cdot \tan\alpha \cdot \tan\theta)}{\tan\theta - S \cdot \tan\alpha},$$

$D3 = D1 + (D2 - D1) \cdot n$

TABLE 13

$$\begin{pmatrix} VX \\ VY \end{pmatrix} = \begin{pmatrix} CX \\ CY \end{pmatrix} - \begin{pmatrix} \cos\phi & -\sin\phi \\ \sin\phi & \cos\phi \end{pmatrix} \begin{pmatrix} VZ/\tan\theta \\ 0 \end{pmatrix}$$

TABLE 14

| HIERARCHICAL LEVEL | CLASSIFIED KINDS OF ROADS |
|---|---|
| 4 | FREEWAY, HIGHWAY (CHARGE HIGHWAY) |
| 3 | GENERAL NATIONAL HIGHWAY |
| 2 | PRINCIPAL REGIONAL ROADS |
| 1 | GENERAL ROADS EQUAL TO OR WIDER THAN 5.5 M IN WIDTH |
| 0 | GENERAL ROADS NARROWER THAN 5.5 M IN WIDTH |

TABLE 15

$$\begin{pmatrix} EX1 \\ EY1 \\ EZ1 \end{pmatrix} = \begin{pmatrix} 1 & 0 & 0 \\ 0 & \sin\theta & \cos\theta \\ 0 & -\cos\theta & \sin\theta \end{pmatrix} \times$$

$$\begin{pmatrix} \sin\phi & -\cos\phi & 0 \\ \cos\phi & \sin\phi & 0 \\ 0 & 0 & 1 \end{pmatrix} \begin{pmatrix} MX - VX \\ MY - VY \\ -VZ \end{pmatrix}$$

What is claimed is:

1. An apparatus for navigating a mobile body, comprising:

a) storing means for storing a plurality of road map data, each road map data stored therein being formed on a two-dimensional plane and having a predetermined level of detail;

b) graphical drawing means for graphically drawing at least any one of the road map data stored in said storing means which is related to a present position of the mobile body and a destination which the mobile body is finally to reach on a display image screen in a form of a bird's eye view, said graphical drawing means varying the level of detail of the road map data graphically drawn thereby according to a display position for said road map data on the display image screen; and c) a display unit, having the display image screen, to operatively display the graphically drawn road map data in the form of the bird's eye view on the display image screen so that the graphically drawn road map data is viewed approximately three-dimensionally with an appearance of depth given to a viewer of the display image screen.

2. An apparatus for navigating a mobile body as claimed in claim 1, wherein the display image screen includes lower and higher display regions, and said graphical drawing means operates for graphically drawing a specific one of the road map data with a lower level of detail for a display position in the higher display region of the display image screen and for drawing said specific one of the road map data with a higher level of detail for a display position in the lower dismay region of the display image screen.

3. An apparatus for navigating a mobile body as claimed in claim 1, wherein each road map data stored in said storing means includes road data, each road data being constituted by a plurality of points and a line interconnecting the points, and a plurality of data related to mutually different degrees of display priorities, wherein said graphical drawing means comprises:

d) selecting means for selecting any of a plurality of regional meshes covering the road map data to be graphically drawn and which is stored in said storing means on the basis of contents of the data related to the display priorities on the image screen of the display unit and on the basis of the display position of the road map data on the display image screen of the display unit; and e) extraction controlling means for controlling an interval of points at which the road data constituted by the points and selected by said selecting means are extracted to graphically draw the selected road map data on the display image screen of the display unit on the basis of the contents of the data related to the display priorities and on the basis of the display position of the selected road map data on the display image screen of said display unit, and wherein said graphical drawing means graphically draws the road map in the form of the bird's eye view on the image screen of the display unit on the basis of the road map data selected by said selecting means and the road data which receives the controlled extraction by said extracting controlling means.

4. An apparatus for navigating a mobile body as claimed in claim 3, wherein the display image screen includes a lowest display region and a highest display region, said selecting means selects data having priorities from a highest priority of display up to a lowest priority of display for display in said lowest display region of the display image screen and selects data having respectively higher priorities of display for display at respectively higher display regions with respect to the display image screen.

5. An apparatus for navigating a mobile body as claimed in claim 4, which further comprises display image screen dividing means for dividing the display image screen into five regions including an uppermost display region (5)', a second uppermost display region (4)' lower than said uppermost display region, a third uppermost display region (3)' lower than said second uppermost display region, a middle display region (2)' lower than said third uppermost display region, and the lowest display region (1)' lower than said middle display region.

6. An apparatus for navigating a mobile body as claimed in claim 5, which further comprises setting means for setting a percentage r of controlling the interval of points at which the points of the selected road data are extracted according to the displayed position divided regions on the display image screen of the display unit.

7. An apparatus for navigating a mobile body as claimed in claim 6, wherein the percentage r of controlling the interval of points at which the road data points are extracted is increased as a position of the display position divided regions on the display image screen becomes higher with respect to the image screen.

8. An apparatus for navigating a mobile body as claimed in claim 7, wherein said setting means sets the percentage r using the following equation:

$$\sqrt{\text{①}}\text{area①ara:} \sqrt{\text{②}}\text{area②ara:} \sqrt{\text{④}}\text{area④}$$

$$\text{area:} \sqrt{\text{⑤}}\text{area/} \sqrt{\text{⑤}}\text{area} = 1: r2: r3: r4: r5, \text{wherein}$$

① denotes a lowest region of the road map data to be displayed corresponding to the lowest region of ①'. ② denotes a middle region of the road map data to be displayed corresponding to the middle region of the display image screen ②'. ③ denotes a third uppermost region of the road map data to be displayed corresponding to the middle region of ③'. ④ denotes a second uppermost region of the road map data to be displayed corresponding to the second uppermost region of ④' of the display image screen. ⑤ denotes an uppermost region of the road map data to be displayed corresponding to the uppermost region of ⑤' in the display image screen. r2 denotes the percentage r for the middle region in the display image screen ③'. r3 denotes the percentage r for the third uppermost ③' region in the display image screen. r4 denotes the percentage r for the second uppermost screen ④', and r5 denotes the percentage r for the uppermost region ⑤' in the image screen of the display unit.

9. An apparatus for navigating a mobile body as claimed in claim 1, wherein said storing means stores a first road map data having a first degree of particulars and a second road map data having a second degree of particulars, the first degree of the particulars being higher than the second degree of the particulars, said display unit has the image screen divided into a lower display region (abgh) and an upper display region (ghdc) and said graphically drawing means graphically draws the first road map data in the form of the bird's eye view on the lower display region of the image screen of the display unit and the second road map data in the form of the bird's eye view on the upper display region of the image screen of the display unit.

10. An apparatus for navigating a mobile body as claimed in claim 9, which further comprises: d) position calculating means for calculating first coordinate positions on the first road map data as a first area (ABGH) which corresponds to respective apices of the lower display region of the image screen of the display unit and calculating second coordinate positions on the second road map data as a second area (GHDC) which corresponds to respective apices of the upper display region of the image screen of the display unit; e) selecting means for selecting a plurality of regional meshes covering the first area (ABGH) from among the first road map data having the first degree of the particulars on the basis of the first coordinate positions of the first area and for selecting a plurality of other regional meshes covering the second area (GHDC) from among the second road map data having the second degree of the particulars on the basis of the second coordinate positions of the second area (GHDC); and f) extracting means for extracting a first part of the first road map data which corresponds to the first area (ABGH) from among the selected regional meshes and for extracting a second part of the second road map data which corresponds to the second area (GHDC) from among the selected other regional meshes.

11. An apparatus for navigating a mobile body as claimed in claim 10, wherein said graphical drawing means coordinate transforms the extracted first part of the first road map data into the road map on a screen image display coordinate system so as to be displayed in the form of the bird's eye view in the lower display region (abgh) and coordinate transforms the extracted second part of the second road map data into the road map on the screen image display coordinate system so as to be displayed in the form of the bird's eye view in the upper display region of the image screen.

12. An apparatus for navigating a mobile body as claimed in claim 11, wherein said selecting means comprises deriving means for deriving a minimum integer value of m which satisfies the following relationship; $L \leq Lm \cdot m$, wherein L denotes a maximum length from among the lengths between any two apices of the upper display region or the lower display region, Lm denotes a length of a shorter side of the corresponding one of the regional meshes, and wherein said selecting means selects the regional meshes, at least the number of the regional meshes to be selected being expressed as $(m+1)^2$.

13. An apparatus for navigating a mobile body as claimed in claim 1, wherein said storing means stores the plurality of the road map data whose predetermined levels of detail are mutually different from each other and wherein with the image screen of the display unit is divided into a plurality of display regions and wherein said graphical drawing means graphically draws the road map in the form of the bird's eye view on a lowest display region from among the divided display regions on basis of any one of the road map data stored in storing means which has a highest predetermined level of detail and graphically draws any other of the road map data which have lower predetermined levels of detail from among the plurality of stored road map data in display regions of the image screen of the display unit which are higher with respect to the image screen of the display unit.

14. An apparatus for navigating a mobile body as claimed in claim 13, which further comprises: d) position calculating means for calculating coordinate positions on the road map data corresponding to respective apices of the respective display regions and corresponding to apices of the respective regions; e) selecting means for selecting a plurality of regional meshes covering the road map data to be displayed on the respective display regions and which are stored in said storing means; and f) extracting means for extracting the road map data to be displayed on the respective display regions from the selected regional meshes.

15. An apparatus for navigating a mobile body as claimed in claim 14, wherein said graphical drawing means coordinate transforms the extracted road map data into the road map on a screen image display coordinate system so as to be displayed in the form of the bird's eye view such that any one of the extracted road map data having the highest degree of the particulars is displayed on the lowest display region of the image screen surrounding the present position of the mobile body and any other of the extracted road map data having the lower degree of the particulars are displayed on the corresponding upper display regions of the image screen so that any one of the road map data which has a lowest degree of the particulars is displayed on an uppermost display region surrounding the destination.

16. An apparatus for navigating a mobile body as claimed in claim 15, wherein said selecting means comprises deriving means for deriving a minimum integer value m which satisfies a relationship as $L \leq Lm \cdot m$, wherein L denotes a maximum length from among the lengths between any two apices of the respective display region, Lm denotes a length of a shorter side of the corresponding one or the regional meshes, and wherein said selecting means selects the regional meshes, at least the number of the selected regional meshes being expressed as $(m+1)^2$ number of the regional meshes.

17. An apparatus for navigating a mobile body as claimed in claim 16, wherein when $L<Lm$, the value of m indicates 1 and the selected number of the regional meshes are four and when $L>Lm$, the value of m indicates 2 and the selected number of the regional meshes are nine.

18. An apparatus for navigating a mobile body as claimed in claim 1, wherein said storing means stores a plurality of lateral and longitudinal line segments, each one of the lateral and longitudinal line segments being parallel to the other lateral and longitudinal line segments, respectively, and each one of the lateral line segments being perpendicular to the longitudinal line segments so that all of the line segments constitute a grid shape on the road map data on the two-dimensional plane, and which further comprises: d) line segment transforming means for coordinate transforming the plurality of lateral and longitudinal line segments into coordinate transformed line segments in the form of the bird's eye view; and e) second graphically drawing means for graphically drawing the coordinate transformed line segments on the road map displayed in the form of the bird's eye view on the display image screen of the display unit.

19. An apparatus for navigating a mobile body as claimed in claim 18, wherein said line segment transforming means transforms the plurality of the lateral and longitudinal line segments whenever the mobile body has moved by a predetermined distance or whenever the mobile body has turned through an angle equal to or greater than a predetermined angle.

20. An apparatus for navigating a mobile body as claimed in claim 19, wherein each of the longitudinal line segments corresponds to a line of geographical longitude and each of the lateral line segments corresponds to another line of geographical latitude, each of both lines of the geographical longitudes and latitudes being spaced apart from the other one of the corresponding lines with a predetermined interval of distance.

21. An apparatus for navigating a mobile body as claimed in claim 20, wherein said second graphically drawing means graphically draws the lines of the geographical longitudes and the lines of the latitudes by mutually different methods.

22. An apparatus for navigating a mobile body as claimed in claim 21, wherein said second graphically drawing means graphically draws the lines of the geographical longitudes and latitudes with the lines of the geographical longitudes emphasized more than the lines of the geographical latitudes.

23. An apparatus for navigating a mobile body as claimed in claim 22, wherein said lines of the geographical longitudes are denoted by solid lines and said lines of the geographical latitudes are denoted by dotted lines.

24. An apparatus for navigating a mobile body as claimed in claim 1; wherein said storing means stores a plurality of line segments of the geographical longitudes and latitudes in the form of the bird's eye view when viewing said line segments from a predetermined view point along a predetermined line of sight, and which further comprises d) second graphical drawing means for graphically drawing the plurality of line segments of longitudes and latitudes into the road map displayed on the image screen in the form of the bird's eye view.

25. An apparatus for navigating a mobile body as claimed in claim 24, wherein said graphically drawn lines of the geographical longitudes and latitudes on the road map in the form of the bird's eye view are left unchanged even when the vehicle runs by a predetermined distance toward the destination or when the vehicle has turned through an angle equal to or greater than a predetermined angle.

26. An apparatus for navigating a mobile body as claimed in claim 25, wherein each of both lines of the geographical longitudes and latitudes being spaced apart from the other one of the corresponding lines with a predetermined interval of distance.

27. An apparatus for navigating a mobile body as claimed in claim 26, wherein said second graphically drawing means graphically draws the lines of the geographical longitudes and the lines of the latitudes by mutually different methods.

28. An apparatus for navigating a mobile body as claimed in claim 27, wherein said second graphically drawing means graphically draws the lines of the geographical longitudes and latitudes with the lines of the geographical longitudes emphasized more than the lines of the latitudes.

29. A navigating apparatus comprising:
  a) present position detecting means for detecting a present position of a mobile body and a forwarding direction toward which the mobile body moves at the present position thereof;
  b) initial display parameter value setting means for previously setting the detected present position and display parameters thereinto as initial values;
  c) direction of line of sight determining means for determining a direction of line of sight for a perspectively projected image on the basis of at least the detected forward direction;
  d) view point position determining means for determining a position of a view point on which the direction of line of sight is based as a function of at least the information of the forwarding direction detected by the present position detecting means;
  e) road map data storing means for storing at least a road map data expressed with a two-dimensional X-Y plane as a reference;
  f) coordinate transforming means for executing a coordinate transformation of the road map data stored in said road map storing means on the basis of at least the determined direction of line of sight and the determined view point into a bird's eye view so as to generate the bird's eye view therefrom;
  g) display means for receiving the display data of the bird's eye view and for displaying the bird's eye view on its image screen; and
  h) graphical drawing means for graphically drawing any one of road map data stored in said road map data storing means and having a relatively high level of detail in the form of the bird's eye view on a relatively low positioned region of the image screen through said display means and for graphically drawing another road map data stored in the road map data storing means and which is adjacent to the road map having the relatively high level of detail, said other road map data having a relatively low level of detail being graphically drawn in the form of the bird's eye view on a relatively high positioned region of the image screen through said display unit, so that a whole displayed road map is in the form of the bird's eye view as an approximately three-dimensional image with an appearance of depth given to a viewer.

30. A method for navigating a mobile body along a set route of travel, comprising the steps of:
  a) storing a plurality of road map data, each stored road map data being formed on a two-dimensional plane and having a predetermined level of detail;
  b) graphically drawing at least any one of the stored road map data which is related to a present position of the mobile body and a destination which the mobile body is finally to reach on a display image screen in a form of a bird's eye view and varying the drawn level of detail according to a display position of the road map data on the display image screen; and
  c) displaying the graphically drawn road map data in the form of the bird's eye view on the display image screen so that the graphically drawn road map data is viewed approximately three-dimensionally to give an appearance of depth to a viewer.

31. An apparatus for navigating a mobile body, comprising:
  a) storing means for storing a plurality of road map data, each road map data stored in said storing means including information having a predetermined degree of particularity of details of the road map data;
  b) graphical drawing means for graphically drawing at least any one of the road map data stored in said storing means which is related to a present position of the mobile body and a destination which the mobile body is finally to reach on a display image screen in a form of a bird's eye view,
  said graphical drawing means drawing said any one of the road map data with a degree of particularity of details which is determined by a display position thereof on the display image screen; and
  c) a display unit including said display image screen;

d) said display unit operatively displaying the graphically drawn road map data in the form of the bird's eye view on said display image screen thereof so that the graphically drawn road map data is viewed approximately three-dimensionally with an appearance of depth given to a viewer of the display image screen.

* * * * *